(12) United States Patent
Ying et al.

(10) Patent No.: US 11,260,905 B2
(45) Date of Patent: Mar. 1, 2022

(54) HUMAN-MACHINE INTERACTION VEHICLE

(71) Applicant: HANGZHOU CHIC INTELLIGENT TECHNOLOGY CO., LTD., Zhejiang (CN)

(72) Inventors: Jiawei Ying, Hangzhou (CN); Keping Xiao, Hangzhou (CN)

(73) Assignee: HANGZHOU CHIC INTELLIGENT TECHNOLOGY CO., LTD., Hangzhou (CN)

( * ) Notice: Subject to any disclaimer, the term of this patent is extended or adjusted under 35 U.S.C. 154(b) by 164 days.

(21) Appl. No.: 16/172,032

(22) Filed: Oct. 26, 2018

(65) Prior Publication Data

US 2019/0092387 A1 Mar. 28, 2019

Related U.S. Application Data

(63) Continuation-in-part of application No. PCT/CN2017/092610, filed on Jul. 12, 2017, and a
(Continued)

(30) Foreign Application Priority Data

Oct. 10, 2015 (CN) .......................... 201510651451.6
Nov. 25, 2016 (CN) .......................... 201611056462.0
(Continued)

(51) Int. Cl.
*B62D 11/00* (2006.01)
*B62K 11/00* (2006.01)
(Continued)

(52) U.S. Cl.
CPC .......... *B62D 11/003* (2013.01); *A63C 17/011* (2013.01); *A63C 17/12* (2013.01);
(Continued)

(58) Field of Classification Search
USPC ......................................................... 701/49
See application file for complete search history.

(56) References Cited

U.S. PATENT DOCUMENTS

| | | |
|---|---|---|
| 3,338,328 A | 8/1967 | Cataldo |
| 3,876,025 A | 4/1975 | Green |

(Continued)

FOREIGN PATENT DOCUMENTS

| | | |
|---|---|---|
| CN | 2061469 U | 9/1990 |
| CN | 2327419 Y | 7/1999 |

(Continued)

OTHER PUBLICATIONS

M. Sasaki et al., Steering Control of the Personal Riding-type Wheeled Mobile Platform (PMP), IEEE, (Dec. 5, 2005).*

*Primary Examiner* — Maceeh Anwari
(74) *Attorney, Agent, or Firm* — Metis IP LLC

(57) ABSTRACT

A human-machine interaction somatosensory vehicle is provided. The human-machine interaction somatosensory vehicle may include a vehicle body and two wheels mounted on the vehicle body. The two wheels may rotate around the vehicle body in a radial direction. The vehicle body may include a support frame, two pedal devices mounted on the support frame, a controller, and a driving device configured to drive the two wheels. The support frame may be an integral structure rotatably connected to the two pedal devices. The two pedal devices each may include a pedal foot board and a first position sensor. The first position sensor may be mounted between the pedal foot board and the support frame, and configured to detect stress information of the pedal device. The controller may be configured to control the driving device to drive the two wheels to move or turn based on the stress information of the pedal devices.

24 Claims, 30 Drawing Sheets

Related U.S. Application Data continuation-in-part of application No. 15/493,217, filed on Apr. 21, 2017, now Pat. No. 10,144,451, which is a continuation of application No. 15/193,856, filed on Jun. 27, 2016, now Pat. No. 9,656,688, application No. 16/172,032, which is a continuation-in-part of application No. 15/408,322, filed on Jan. 17, 2017, now Pat. No. 10,144,478.

(30) Foreign Application Priority Data

| | | |
|---|---|---|
| Dec. 17, 2016 | (CN) | 201611222975.4 |
| Jan. 4, 2017 | (CN) | 201710005991.6 |
| Jan. 4, 2017 | (CN) | 201710005993.5 |
| Jan. 4, 2017 | (CN) | 201710006181.2 |
| Jan. 4, 2017 | (CN) | 201710006953.2 |

(51) Int. Cl.

| | |
|---|---|
| *B62D 11/02* | (2006.01) |
| *B62D 51/02* | (2006.01) |
| *A63C 17/12* | (2006.01) |
| *B62J 25/00* | (2020.01) |
| *A63C 17/01* | (2006.01) |
| *B62J 45/40* | (2020.01) |

(52) U.S. Cl.
CPC ............. *B62D 11/02* (2013.01); *B62D 51/02* (2013.01); *B62J 25/00* (2013.01); *B62K 11/007* (2016.11); *A63C 2203/12* (2013.01); *A63C 2203/18* (2013.01); *A63C 2203/24* (2013.01); *A63C 2203/42* (2013.01); *B62J 45/40* (2020.02)

(56) References Cited

U.S. PATENT DOCUMENTS

| | | |
|---|---|---|
| 4,484,648 A | 11/1984 | Jephcott |
| 5,274,576 A | 12/1993 | Williams |
| 5,577,567 A | 11/1996 | Johnson et al. |
| 5,621,643 A | 4/1997 | Nakagami et al. |
| 5,628,379 A | 5/1997 | Watkins |
| 5,644,204 A | 7/1997 | Nagle |
| 5,682,132 A | 10/1997 | Hiroyoshi et al. |
| 5,701,965 A | 12/1997 | Kamen et al. |
| 5,757,161 A | 5/1998 | Ikkai et al. |
| 5,791,425 A | 8/1998 | Kamen et al. |
| 5,819,866 A | 10/1998 | Smith et al. |
| 5,960,900 A | 10/1999 | Cheng |
| 6,039,142 A | 3/2000 | Eckstein et al. |
| 6,050,357 A | 4/2000 | Staelin et al. |
| 6,240,356 B1 | 5/2001 | Lapke |
| 6,288,505 B1 | 9/2001 | Heinzmann et al. |
| 6,302,230 B1 | 10/2001 | Kamen et al. |
| 6,367,817 B1 | 4/2002 | Kamen et al. |
| 6,408,240 B1 | 6/2002 | Morrell et al. |
| 6,538,411 B1 | 3/2003 | Field et al. |
| 6,561,294 B1 | 5/2003 | Kamen et al. |
| 7,090,040 B2 | 8/2006 | Kamen et al. |
| 7,138,774 B2 | 11/2006 | Negoro et al. |
| 7,174,976 B2 | 2/2007 | Kamen et al. |
| 7,240,908 B2 | 7/2007 | Sankrithi |
| 7,275,607 B2 | 10/2007 | Kamen et al. |
| 7,293,622 B1 | 11/2007 | Spital |
| 7,363,993 B2 | 4/2008 | Ishii |
| 7,367,572 B2 | 5/2008 | Jiang |
| 7,407,187 B2 | 8/2008 | Kakinuma et al. |
| 7,424,927 B2 | 9/2008 | Hiramatsu |
| 7,481,291 B2 | 1/2009 | Nishikawa |
| D601,922 S | 10/2009 | Imai et al. |
| 7,703,568 B2 | 4/2010 | Ishii |
| 7,775,534 B2 | 8/2010 | Chen et al. |
| 7,789,174 B2 | 9/2010 | Kamen et al. |
| 7,958,956 B2 | 6/2011 | Kakinuma et al. |
| 7,963,352 B2 | 6/2011 | Alexander |
| 8,157,274 B2 | 4/2012 | Chen |
| 8,459,668 B2 | 6/2013 | Yoon |
| 8,738,278 B2 | 5/2014 | Chen |
| 8,925,657 B2 | 1/2015 | Kamen et al. |
| 9,148,077 B2 | 9/2015 | Henderson |
| 9,188,984 B2 | 11/2015 | Kamen et al. |
| 9,254,759 B1 | 2/2016 | Henderson et al. |
| 9,352,665 B2 | 5/2016 | Melvin et al. |
| 9,376,155 B2 | 6/2016 | Ying et al. |
| 9,656,688 B2 | 5/2017 | Ying |
| D807,457 S | 1/2018 | Desberg |
| 2003/0094315 A1 | 5/2003 | White |
| 2004/0005958 A1 | 1/2004 | Kamen et al. |
| 2004/0063556 A1 | 4/2004 | Wischusen |
| 2006/0260857 A1 | 11/2006 | Kakinuma et al. |
| 2007/0084662 A1 | 4/2007 | Oikawa |
| 2007/0273118 A1 | 11/2007 | Conrad |
| 2008/0084175 A1 | 4/2008 | Hollis |
| 2008/0147281 A1 | 6/2008 | Ishii et al. |
| 2009/0032323 A1 | 2/2009 | Kakinuma et al. |
| 2009/0105908 A1 | 4/2009 | Casey et al. |
| 2009/0288900 A1 | 11/2009 | Takenaka et al. |
| 2010/0025139 A1 | 2/2010 | Kosaka et al. |
| 2010/0114468 A1 | 5/2010 | Field et al. |
| 2010/0121538 A1 | 5/2010 | Ishii et al. |
| 2010/0222994 A1 | 9/2010 | Field et al. |
| 2010/0225080 A1 | 9/2010 | Smith |
| 2011/0010066 A1 | 1/2011 | Fuwa |
| 2012/0035809 A1 | 2/2012 | Kosaka |
| 2012/0166048 A1 | 6/2012 | Inoue et al. |
| 2013/0299263 A1 | 11/2013 | Shimizu et al. |
| 2014/0265690 A1 | 9/2014 | Henderson |
| 2014/0305714 A1 | 10/2014 | Huang |
| 2014/0326525 A1 | 11/2014 | Doerksen |
| 2015/0046002 A1 | 2/2015 | Shih et al. |
| 2015/0096820 A1 | 4/2015 | Strack |
| 2015/0353158 A1 | 12/2015 | Chang |
| 2016/0068056 A1 | 3/2016 | Burtov et al. |

FOREIGN PATENT DOCUMENTS

| | | |
|---|---|---|
| CN | 1241483 A | 1/2000 |
| CN | 101219275 A | 7/2008 |
| CN | 101362018 B | 6/2010 |
| CN | 101229426 B | 12/2010 |
| CN | 101920728 A | 12/2010 |
| CN | 102000429 A | 4/2011 |
| CN | 101843974 B | 8/2011 |
| CN | 202070117 U | 12/2011 |
| CN | 102602481 A | 7/2012 |
| CN | 102616310 A | 8/2012 |
| CN | 102139733 B | 11/2012 |
| CN | 103192913 A | 7/2013 |
| CN | 102275621 B | 8/2013 |
| CN | 203158157 U | 8/2013 |
| CN | 203381739 U | 1/2014 |
| CN | 103600799 A | 2/2014 |
| CN | 103770872 A | 5/2014 |
| CN | 102614652 B | 7/2014 |
| CN | 102514662 B | 4/2015 |
| CN | 102514663 B | 5/2015 |
| CN | 105446337 A | 3/2016 |
| CN | 205186405 U | 4/2016 |
| CN | 105667660 A | 6/2016 |
| CN | 105711702 A | 6/2016 |
| CN | 205345206 U | 6/2016 |
| CN | 105774991 A | 7/2016 |
| CN | 105799828 A | 7/2016 |
| CN | 105905205 A | 8/2016 |
| CN | 105947042 A | 9/2016 |
| CN | 205554419 U | 9/2016 |
| CN | 205589405 U | 9/2016 |
| CN | 205686537 U | 11/2016 |
| CN | 106627896 A | 5/2017 |
| CN | 106828726 A | 6/2017 |
| CN | 106828727 A | 6/2017 |
| CN | 106828728 A | 6/2017 |

(56) References Cited

FOREIGN PATENT DOCUMENTS

| | | |
|---|---:|---|
| DE | 19820059 A1 | 11/1999 |
| DE | 10319177 A1 | 11/2004 |
| GB | 2242173 A | 9/1991 |
| JP | 2004024614 A | 1/2004 |
| JP | 2004276727 A | 10/2004 |
| JP | 2005001554 A | 1/2005 |
| JP | 2005022631 A | 1/2005 |
| JP | 2005094898 A | 4/2005 |
| JP | 2005162060 A | 6/2005 |
| JP | 2006001385 A | 1/2006 |
| JP | 2006256401 A | 9/2006 |
| JP | 3981733 B2 | 9/2007 |
| JP | 2014108747 A | 6/2014 |
| WO | 03068342 A1 | 8/2003 |
| WO | 2005032926 A2 | 4/2005 |

\* cited by examiner

100

110
120
130

HUMAN-MACHINE INTERACTION VEHICLE

CROSS-REFERENCE TO RELATED APPLICATIONS

This application is a continuation-in-part application of International Application No. PCT/CN2017/092610, which claims priority to Chinese Patent Application No. 201710005993.5, filed on Jan. 4, 2017, Chinese Patent Application No. 201710006181.2, filed on Jan. 4, 2017, Chinese Patent Application No. 201710005991.6, filed on Jan. 4, 2017, Chinese Patent Application No. 201710006953.2, filed on Jan. 4, 2017; this application is also a continuation-in-part application of U.S. patent application Ser. No. 15/493,217, filed on Apr. 21, 2017, which is a continuation of U.S. patent application Ser. No. 15/193,856, filed on Jun. 27, 2016, now U.S. Pat. No. 9,656,688, which claims priority to Chinese Patent Application No. 201510651451.6, filed on Oct. 10, 2015; and this application is also a continuation-in-part application of U.S. patent application Ser. No. 15/408,322, filed on Jan. 17, 2017, which claims priority to Chinese Patent Application No. 201611056462.0, filed on Nov. 25, 2016, Chinese Patent Application No. 201611222975.4, filed on Dec. 17, 2016. The contents of each of the above applications are hereby incorporated in their entireties by reference.

TECHNICAL FIELD

The present disclosure generally relates to vehicles, and in particular, to human-machine interaction vehicles and methods of controlling the human-machine interaction vehicle.

BACKGROUND

Recent years have seen the development of a variety of personal transportation vehicles. Human-machine interaction vehicles, also called human-machine interaction somatosensory vehicles, generally fall into two categories: with a handle bar (or a steering pole) and without a handle bar. A human-machine interaction vehicle without a handle bar, also known as a self-balancing scooter, a hoverboard, etc., can be steered by shifts in a user's positions. For example, the user may lean forward or backward to control the speed of the human-machine interaction vehicle. The self-balancing scooter often consists of two motorized wheels connected to a pair of articulated pads on which the user places his/her feet. The pads are rotatable and the user can control the human-machine interaction vehicle to make a turn by twisting the pads with his/her feet. Such a structure is relatively complicated and brings certain difficulties in the maintenance and repair of the human-machine interaction vehicle. In addition, the human-machine interaction vehicle can recognize shifts in the user's position and steer the vehicle in accordance with the user's intentions based on data relating to the shifts in the user's position. This requires the user to place two feet on the pads and the user may not be able to effectively manipulate the human-machine interaction vehicle when sitting or standing on one foot. In other designs, the human-machine interaction vehicle may use pressure sensors to calculate a center of gravity of the user and identify shifts of the center of gravity, but data from these pressure sensors may be skewed if the user is, for example, carrying bags. Therefore, it is desirable to provide human-machine interaction vehicles with relatively simple structures and more efficient methods for controlling the human-machine interaction vehicles.

SUMMARY

According to an aspect of the present disclosure, a human-machine interaction somatosensory vehicle is provided. The human-machine interaction somatosensory vehicle may include a vehicle body and two wheels mounted on the vehicle body. The two wheels may rotate around the vehicle body in a radial direction. The vehicle body may include a support frame, two pedal devices mounted on the support frame, a controller, and a driving device configured to drive the two wheels. The support frame may be an integral structure rotatably connected to the two pedal devices. The two pedal devices each may include a pedal foot board and a first position sensor. The first position sensor may be mounted between the pedal foot board and the support frame, and configured to detect stress information of the pedal device. The controller may be configured to control the driving device to drive the two wheels to move or turn based on the stress information of the pedal devices.

In some embodiments, each of the first position sensors may include two sensing component regions located at two portions of the pedal foot board, and each of the first position sensors may detect stress information of the two positions of the pedal foot board through the two sensing component regions to generate the stress information of the two pedal devices.

In some embodiments, each of the two sensing component regions may include a first force receiving portion and a second force receiving portion. The first force receiving portion of each of the sensing component regions may abut one of the support frame and the pedal foot board, and the second force receiving portion may abut the other one of the support frame and the pedal foot board.

In some embodiments, the first position sensor may include a front end, a rear end, and a connect portion connecting the front end and the rear end. Each of the front end and the rear end may include the first force receiving portion, the second force receiving portion, and the sensing component region located between the first force receiving portion and the second force receiving portion.

In some embodiments, a first gap may be configured between the pedal foot board and the sensing component region.

In some embodiments, a bottom surface of the one of the first force receiving portion or the second force receiving portion that abuts the pedal foot board may be suspended.

In some embodiments, each of the two pedal devices may further include a sensor holder mounted on the support frame, and the one of the first force receiving portion or the second force receiving portion that abuts the support frame may abut the support frame via the sensor holder.

In some embodiments, the first force receiving portion may abut the pedal foot board. The second force receiving portion may abut the sensor holder and the bottom surface of the first force receiving portion may be suspended.

In some embodiments, a second gap may be configured between the sensor holder and the sensing component region.

In some embodiments, the bottom surface of each of the two pedal devices may be recessed upward to accommodate a part of the support frame.

In some embodiments, a guiding rail having a concave portion may be mounted on the support frame. One or more pedal device fixing brackets may be inserted into the guiding rail to mount and hold the two pedal devices.

In some embodiments, the guiding rail that the one or more pedal device fixing brackets inserted into may include either an integral guiding rail or two separate guiding rails on two sides of the vehicle respectively.

In some embodiments, the one or more pedal device fixing brackets may include an insertion part horizontally inserted into the guiding rail and an installation part extending out of the guiding rail configured to mount and hold the two pedal devices.

In some embodiments, a wheel shaft may be mounted between the wheel and the vehicle body. The wheel may be rotatably connected to the vehicle body through the wheel shaft. A center of gravity of the vehicle body may be lower than a center of gravity of the wheel shaft.

In some embodiments, one end of the wheel shaft may be connected to the wheel and the other end of the wheel shaft may be connected to a wheel shaft fixation board that may be mounted on the vehicle body.

In some embodiments, a motor holder matching with the wheel shaft fixation board may be mounted on a side of the support frame, and a center of gravity of the motor holder may be lower than the center of gravity of the wheel shaft.

In some embodiments, a receiving chamber matching with the motor holder may be mounted on the support frame. The motor holder may include a plug end configured to direct the motor holder to be plugged in the receiving chamber and a cap portion connected to the plug end, configured to seal the receiving chamber.

In some embodiments, a connection component may be placed in the human-machine interaction somatosensory vehicle. The connection component may include a power source connection component, a Hall connection component, and a temperature connection component configured to transmit temperature signals.

In some embodiments, the power source may be placed in the support frame. The power source may include a temperature sensor configured to monitor an internal temperature of the power source, and the temperature connection component may be connected to the temperature sensor.

In some embodiments, a wheel cap may be mounted on an outer side of each of the two wheels and anti-collision rubber may be mounted on the wheel cap.

According to another aspect of the present disclosure, a human-machine interaction somatosensory vehicle is provided. The human-machine interaction somatosensory vehicle may include a vehicle body and two wheels mounted on the vehicle body. The two wheels may rotate around the vehicle body in a radial direction, and the vehicle body may further include a support frame, two pedal devices mounted on the support frame, a main control board positioned horizontally in the support frame, and a driving device configured to drive the two wheels. The support frame may be an integral structure rotatably connected to the two pedal devices. The two pedal devices each may include a pedal foot board and a first position sensor, wherein the first position sensor may be mounted between the pedal foot board and the support frame, and configured to detect stress information of the pedal device. The main control board may be configured to control the driving device to drive the two wheels to move or turn based on the stress information of the pedal devices.

In some embodiments, a power source may be placed in the support frame, and a battery docking interface may be mounted on the main control board. The battery docking interface may be electrically connected to the power source.

In some embodiments, supporting ribs configured to support the main control board may be mounted on front and rear sides of the power source. Between the supporting ribs, a groove may be formed between the main control board and the power source.

In some embodiments, an external docking interface may be mounted on left and right sides of the main control board. The external docking interface may be configured to electrically connect to at least one of the two driving devices on both sides in entirety or the first position sensor.

According to still another aspect of the present disclosure, a human-machine interaction somatosensory vehicle is provided. The human-machine interaction somatosensory vehicle may include a vehicle body and two wheels mounted on the vehicle body. The two wheels may rotate around the vehicle body in a radial direction. The human-machine interaction somatosensory vehicle may further include a connection component including a power source connection component, a Hall connection component, and a temperature connection component, configured to transmit a temperature signal. The vehicle body may further include a support frame, two pedal devices mounted on the support frame, a controller, a driving device configured to drive the two wheels, and a wheel shaft mounted between the two wheels and the vehicle body. The support frame may be an integral structure rotatably connected to the two pedal devices. The two pedal devices each may include a pedal foot board and a first position sensor. The first position sensor may be mounted between the pedal foot board and the support frame, and configured to detect stress information of the pedal device. The controller may be configured to control the driving device to drive the two wheels to move or turn based on the stress information of the pedal devices. The two wheels may be rotatably connected to the vehicle body via the wheel shaft. The driving device may be placed in the two wheels and a cable configured to connect the driving device may be placed in the wheel shaft. The cable may extend out of the wheel shaft to connect to a connector. A power source may be placed in the support frame and connected to an external docking interface that may be connected to the connector. A temperature sensor may be mounted in the power source and the temperature connection component may be connected to the temperature sensor. The temperature sensor may be configured to monitor an internal temperature of the power source.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of portions and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In order to make the purpose, technical solution, and advantages of the present disclosure more clear, the present disclosure will be further described in detail below with reference to the accompanying drawings and embodiments. It should be understood that the specific embodiments described herein are merely illustrative of the present disclosure and are not intended to limit the present disclosure.

Figure 1:
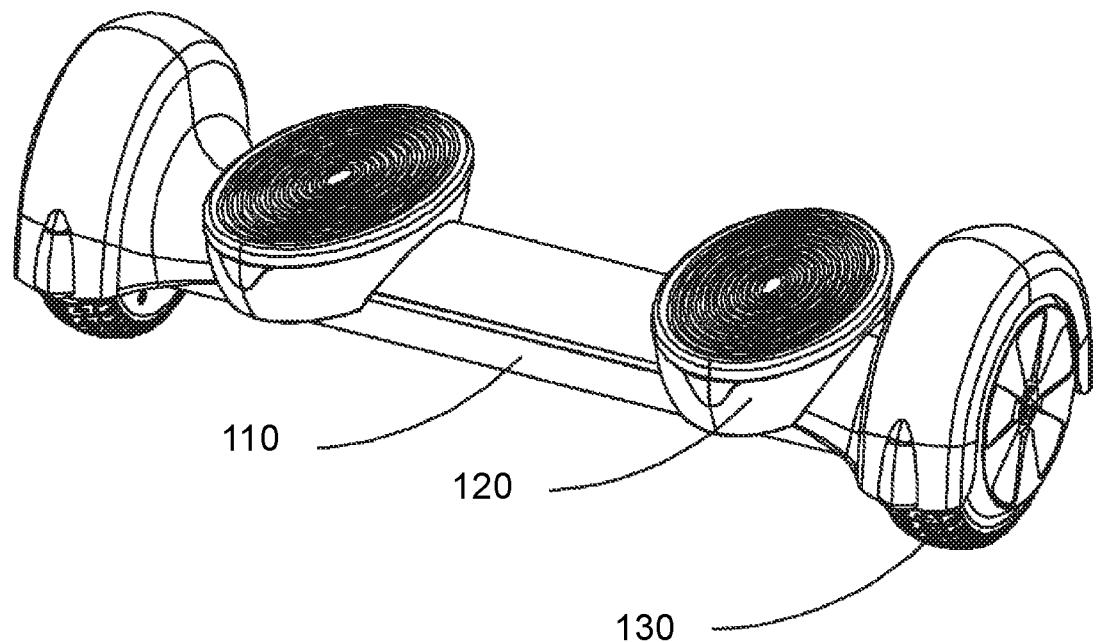
FIG. 1 is a schematic stereogram of an exemplary human-machine interaction somatosensory vehicle according to some embodiments of the present disclosure.
Figure 2:
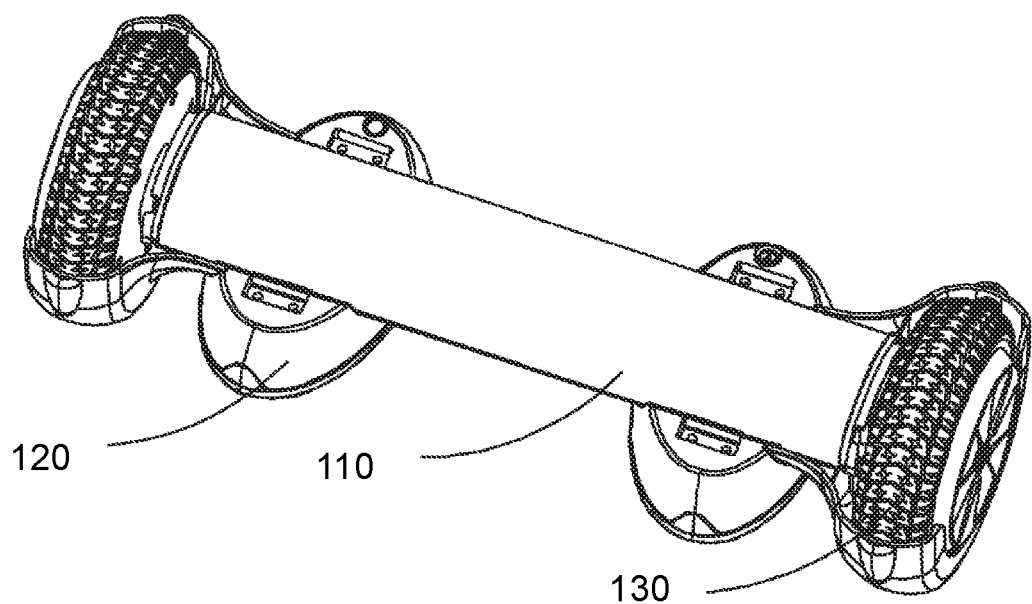
FIG. 2 is a schematic stereogram of the human-machine interaction somatosensory vehicle according to some embodiments of the present disclosure.
Figure 3:
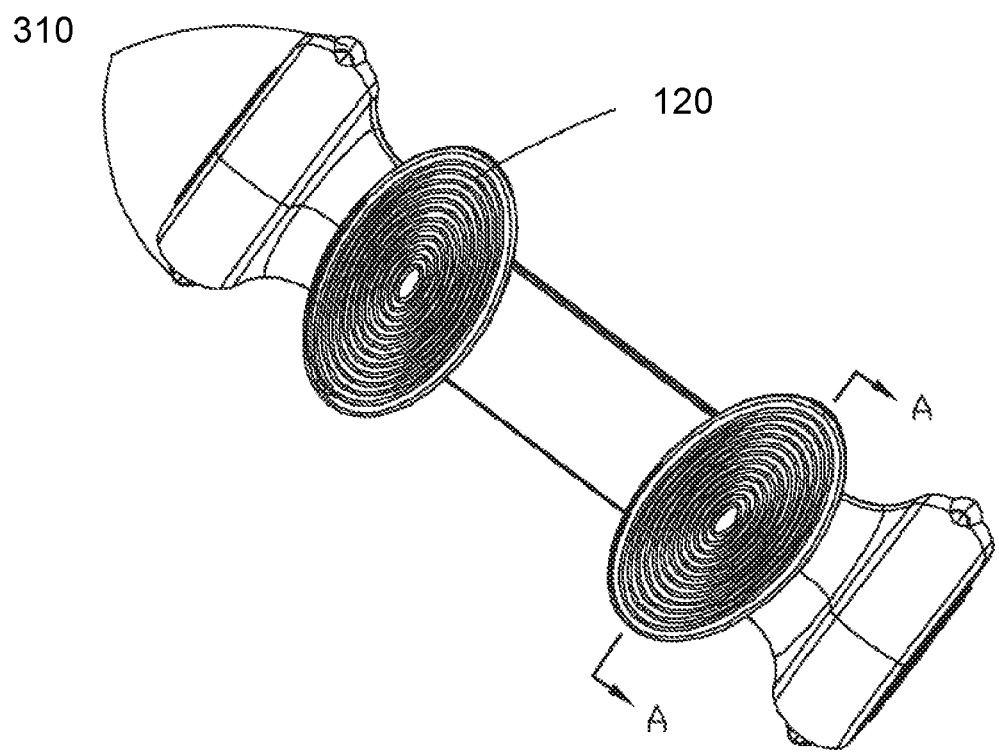
FIG. 3 is a schematic stereogram of the human-machine interaction somatosensory vehicle according to some embodiments of the present disclosure.

FIGS. 1-17 are schematic diagrams of exemplary structures of a human-machine interaction somatosensory vehicle 100. As shown in FIGS. 1-3, the human-machine interaction somatosensory vehicle 100 may include a vehicle body 110 and two wheels 130 mounted on the vehicle body 110. The wheels 130 may rotate around the vehicle body 110 in a radial direction. In some embodiments, the human-machine interaction somatosensory vehicle 100 may include only one wheel or more than two wheels 130 (e.g., four wheels 130).

Figure 8:
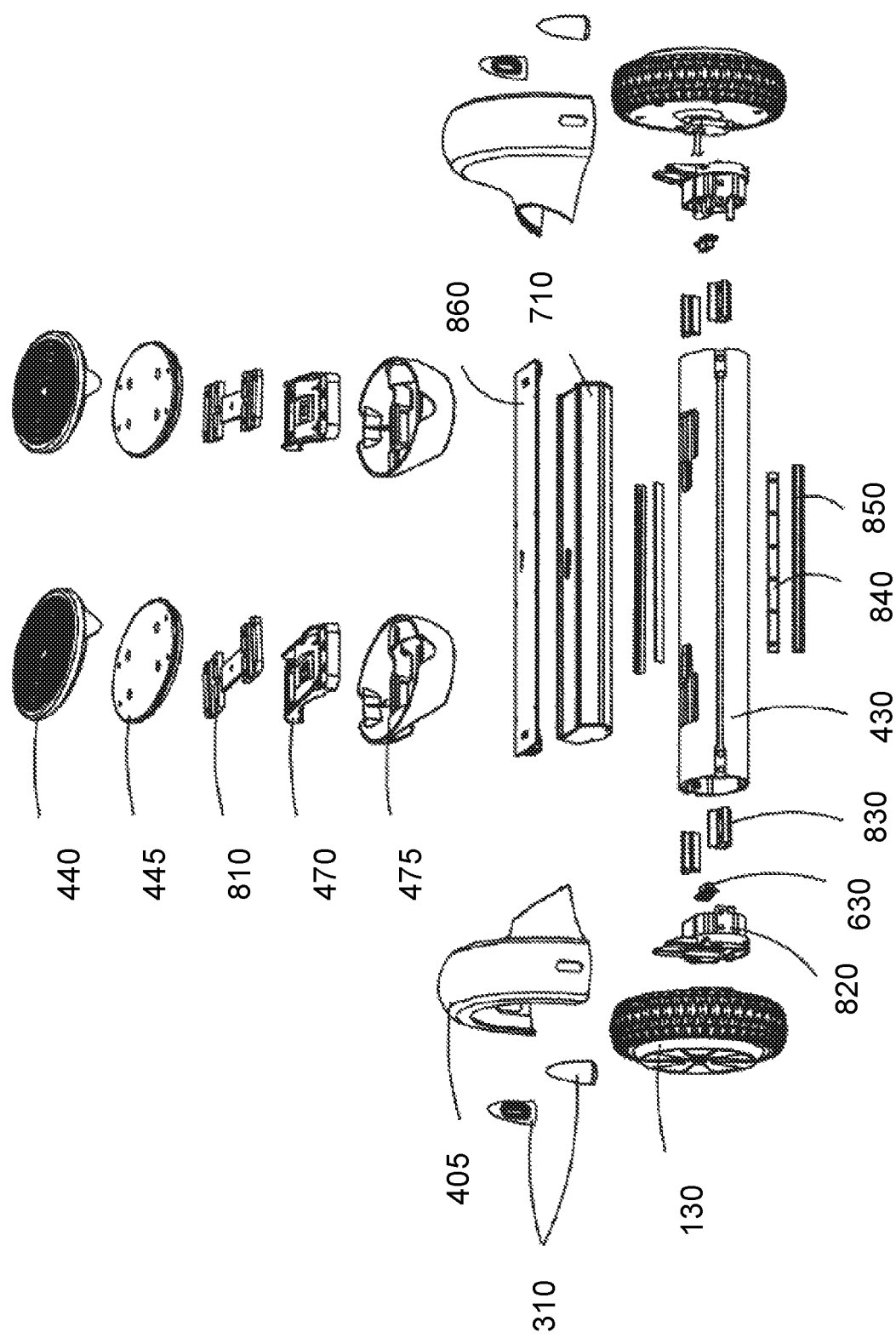
FIG. 8 is an exploded stereogram of the human-machine interaction somatosensory vehicle according to some embodiments of the present disclosure.
Figure 9:
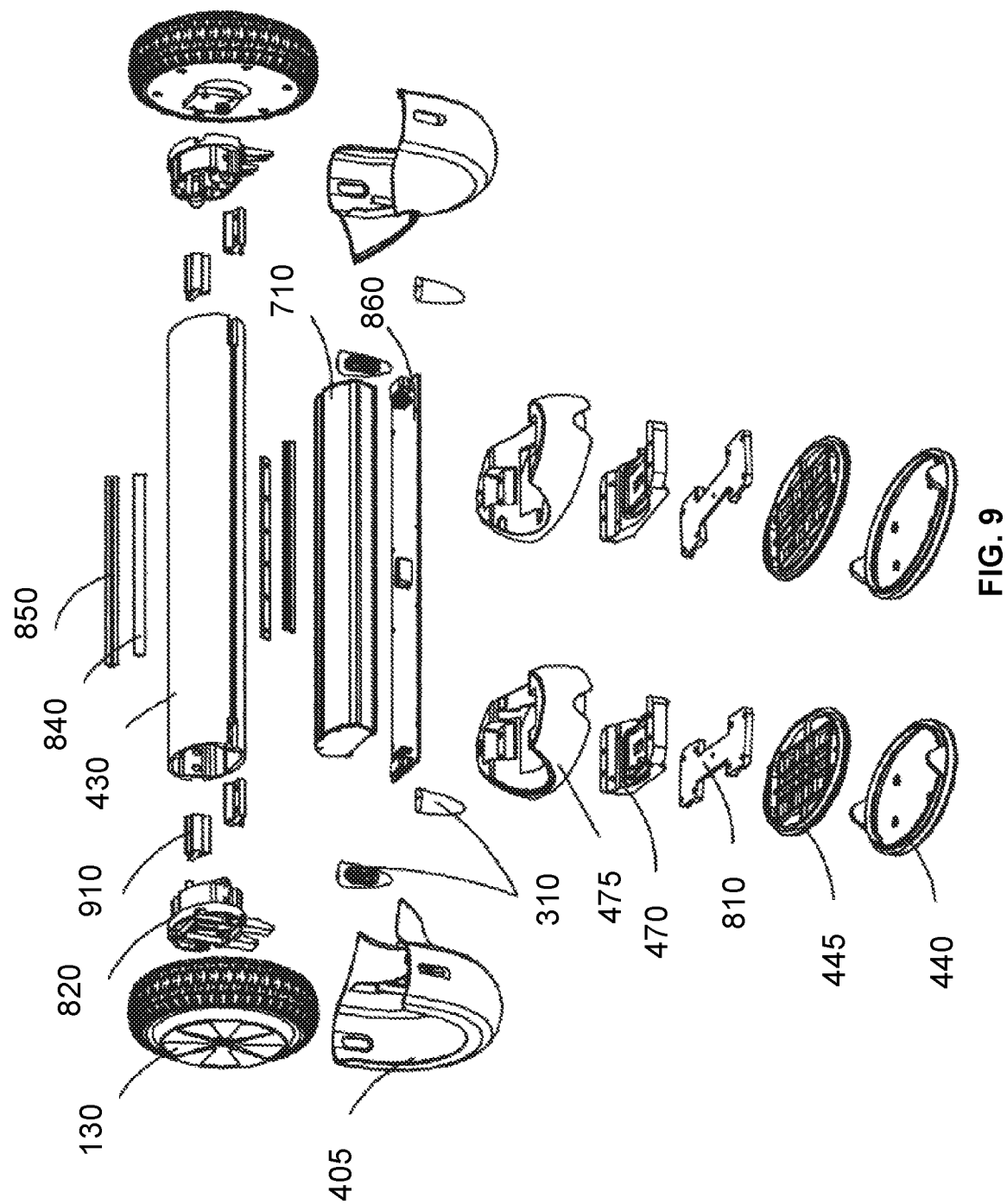
FIG. 9 is an exploded stereogram of the human-machine interaction somatosensory vehicle from another angle according to some embodiments of the present disclosure.

As shown in FIG. 8, the vehicle body 110 may include a support frame 430, two pedal devices 120 mounted on the support frame 430, a controller 860, and a driving device (not shown in FIG. 8) configured to drive the wheels 130. The support frame 430 may be an integral structure and rotatably connected to the wheels 130. Different from a separate support frame in the prior art that includes a left inner cap and a right inner cap which may rotate relative to each other, the integral structure may refer to a one-piece structure. Each of the pedal devices 120 may include a first position sensor 810 configured to detect stress information of the pedal device 120. The controller 860 may be configured to control the driving device to drive the wheels to move or make a turn according to the stress information of the pedal devices 120. It should be noted that the movement of the wheels 130 (e.g., straight forward/backward movement) may refer to a simultaneous movement of the wheels 130. The simultaneous movement of the wheels may be achieved by the driving device outputting the same output signals to the wheels 130 so that the wheels 130 may have the same rotational speed to drive the vehicle body 110 to move forward or backward. When forces received by each of the wheels 130 (e.g., a driving force generated by the driving device, a friction force generated by the ground) are balanced respectively, the vehicle body 110 may be stationary or moving forward/backward at a constant speed. To make a turn by the wheels 130, the driving device may output two different output signals or driving forces to the left wheel and the right wheel of the wheels 130, respectively (or two different output signals to a pair of left wheels and a pair of right wheels of the wheels 130, respectively), so that the speed of the wheels 130 may be different, and thus the vehicle body 110 may make a turn when moving forward or backward.

Figure 4:
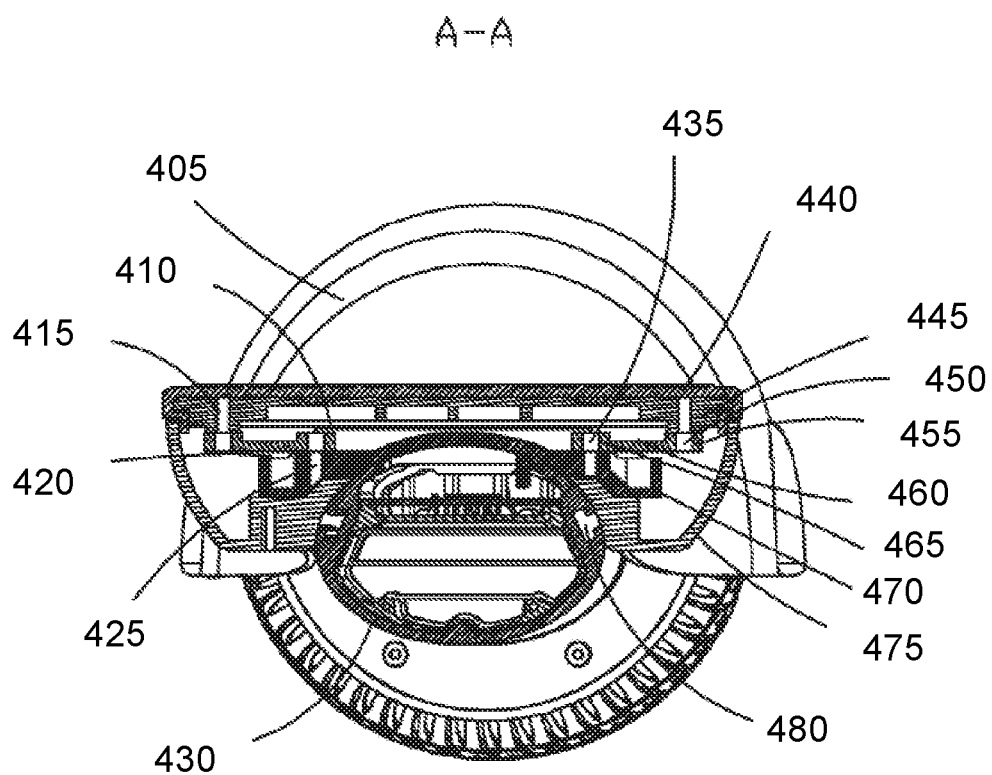
FIG. 4 is a cross-sectional view of the human-machine interaction somatosensory vehicle along the line A-A in FIG. 3 according to some embodiments of the present disclosure.
Figure 10:
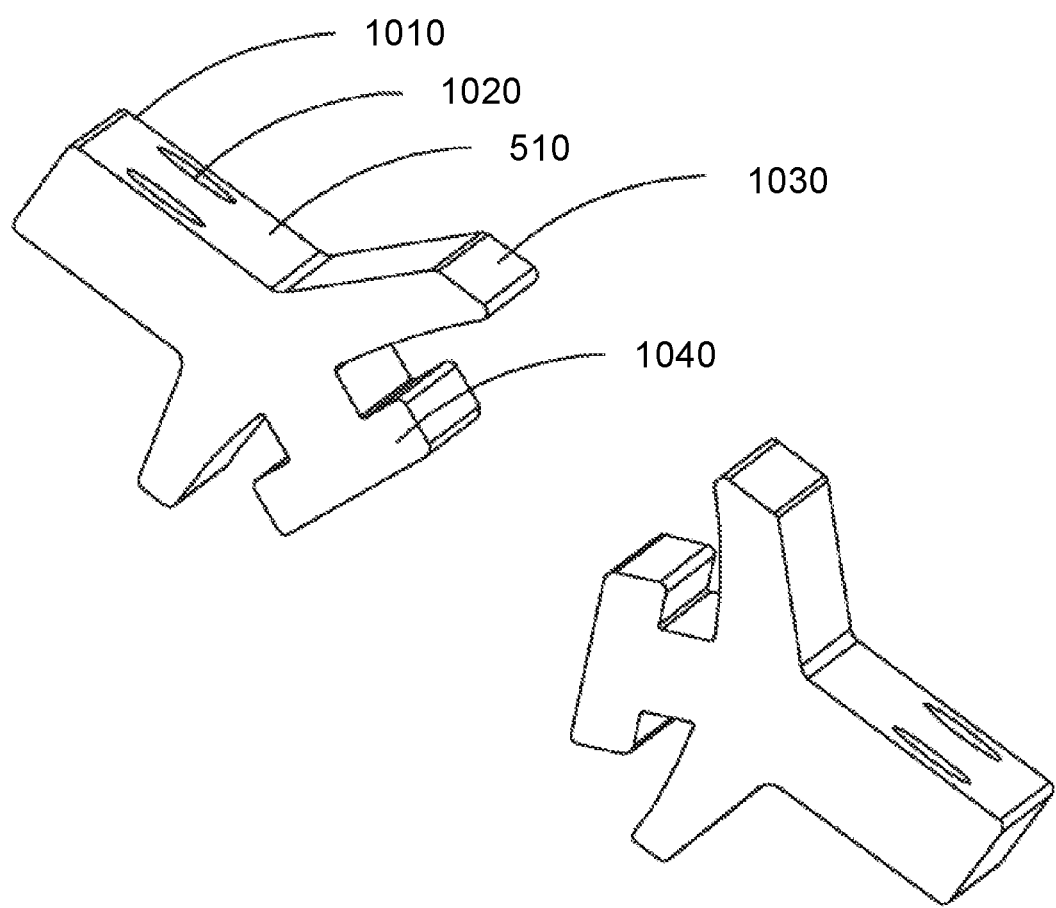
FIG. 10 is a schematic stereogram of a pedal device fixing bracket of the human-machine interaction somatosensory vehicle according to some embodiments of the present disclosure.
Figure 11:
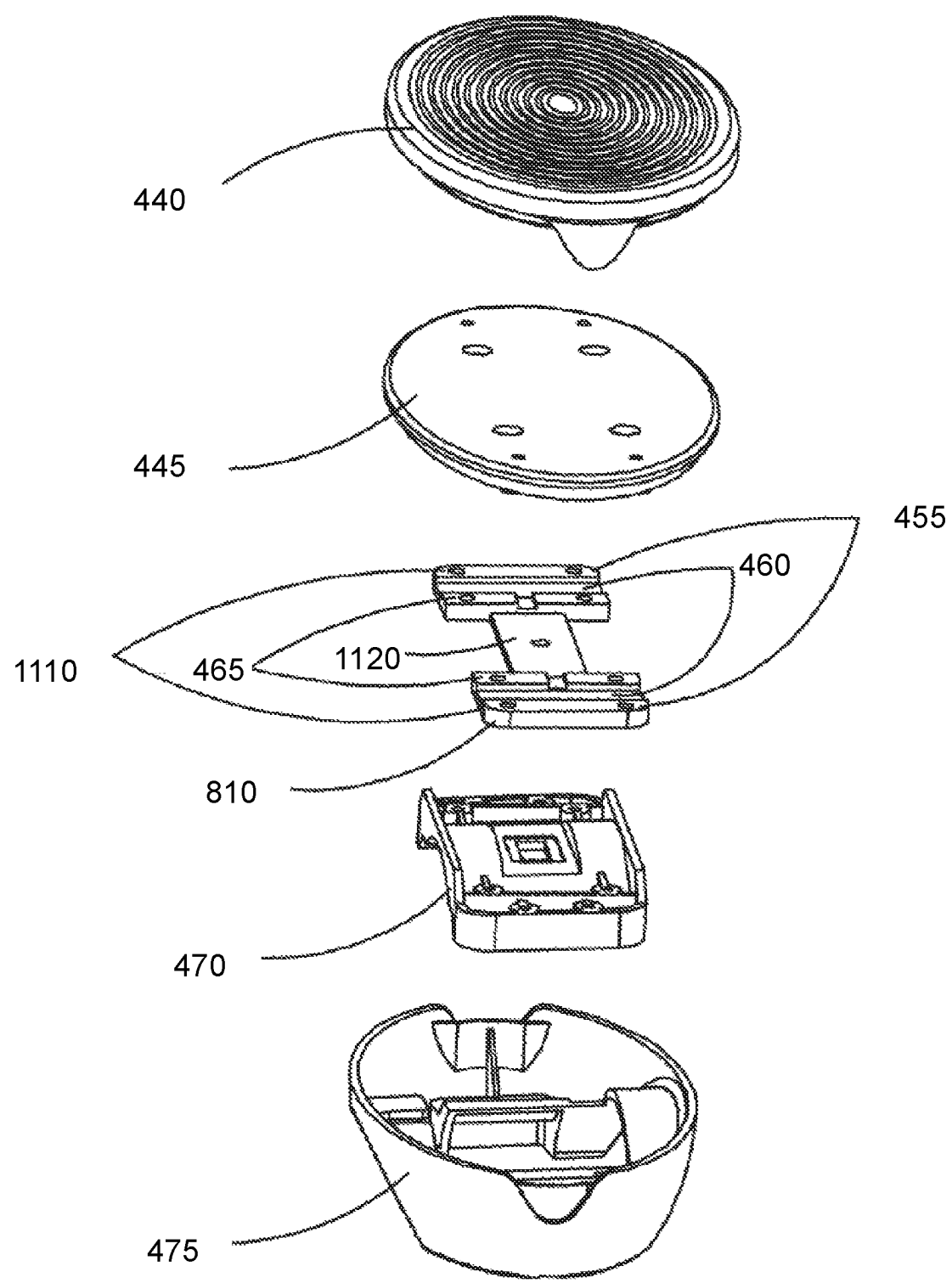
FIG. 11 is an exploded diagram of the structure of the pedal device of FIG. 8.
Figure 12:
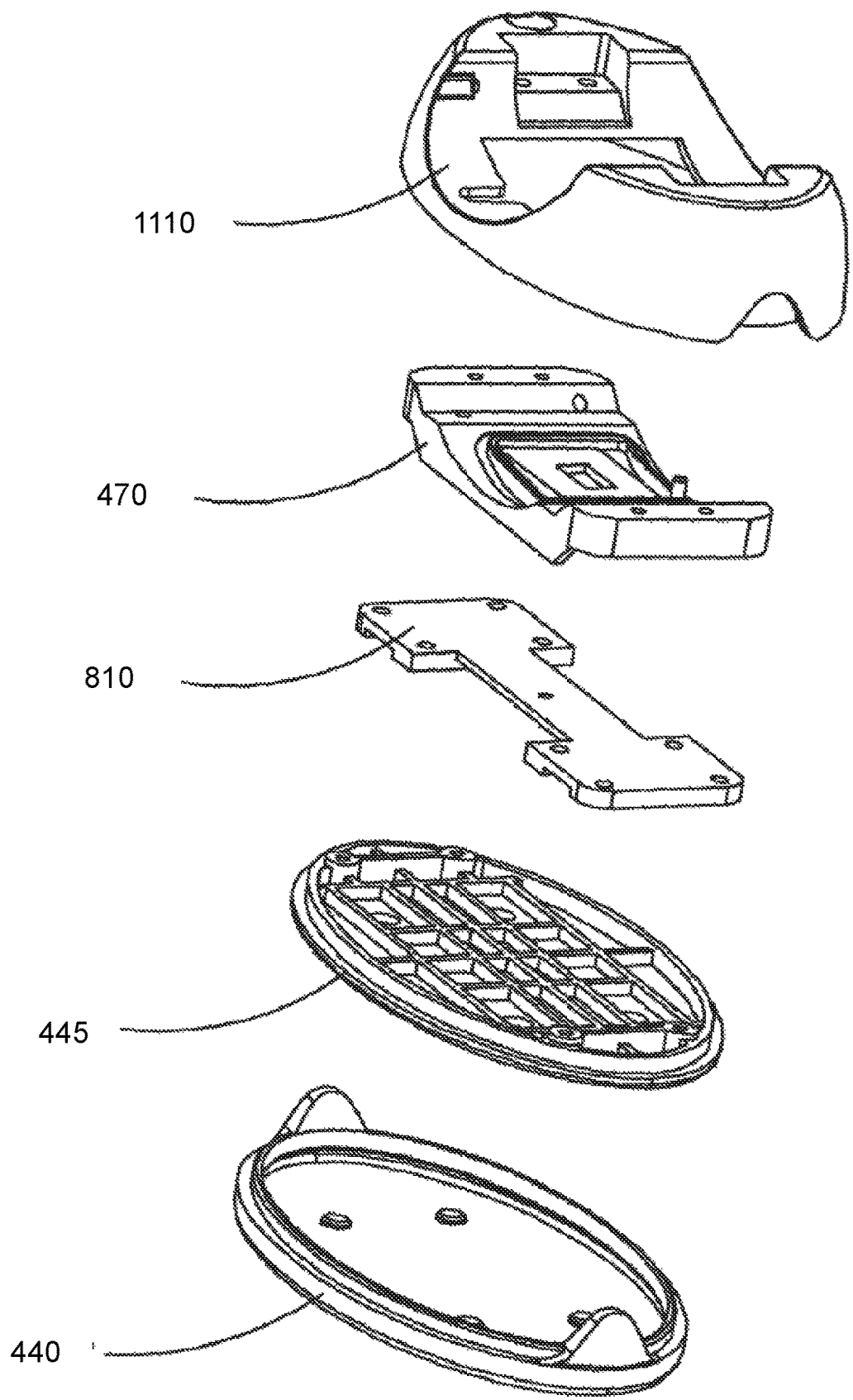
FIG. 12 is an exploded perspective view of the pedal device of FIG. 11 according to some embodiments of the present disclosure.

As shown in FIG. 4, a guiding rail 480 having a concave portion may be mounted on the support frame 430. As shown in FIG. 10, a pedal device fixing bracket 1010 may be inserted into the guiding rail 480. The pedal device fixing bracket 1010 may be configured to mount and fix the pedal devices 120. With such configurations, the structure of the human-machine interaction somatosensory vehicle 100 can be simple, e.g., it can be easy to assemble the pedal devices 120 with the vehicle body 110 via the guiding rail 480. In some embodiments, the support frame 430 and the pedal device fixing bracket 1010 can be manufactured separately. Various manufacturing processes may be selected according to specific requirements for the support frame 430 and the pedal device fixing bracket 1010. In some embodiments, the support frame 430 may be tubular, and a separate manufacturing process is convenient for the manufacture of the support frame 430. In some embodiments, the support frame 430 may be manufactured by assembling a plurality of components. The shape of the support frame 430 may be triangular, rectangular, circular, oval, polygonal, or the like. The support frame 430 may extend in lateral direction (e.g., left-right direction) with constant cross-sectional shape or inconstant cross-sectional shape (e.g., at least partially enlarged, at least partially narrowed, at least partially twisted, at least partially displaced).

In some embodiments, the guiding rail 480 may extend in the lateral direction (e.g., left-right direction), and mounted on the front side and/or the rear side of the support frame 430. As used herein, the lateral direction may also refer to the rotation axis of the wheels 130. The pedal device fixing bracket 1010 may be inserted into the support frame 430, so that the pedal device fixing bracket 1010 may be subjected to a higher supporting force in the vertical direction (e.g., the up-down direction), which may improve the performance of the pedal devices 120 (e.g., more stable).

In some embodiments, one or more pedal device fixing brackets 1010 configured to mount and hold the left and right pedal devices 120 may be inserted into the left and right ends of the guiding rail 480 (e.g., grooves on the guiding rail), respectively. With such configuration(s), the left and right pedal devices 120 may be held firmly by the pedal device fixing bracket 1010. In some embodiments, the guiding rail 480 may be either an integral guiding rail or two separate guiding rails on two sides of the vehicle 100, e.g., the front side and the rear side, the left side and the right side. For example, a front side guiding rail 480 may be simultaneously connected to the two pedal device fixing brackets 1010 to hold the two pedal devices 120, respectively. Such a structure is simple and can be manufactured and assembled easily. In some embodiments, separate guiding rails 480 may be mounted on the human-machine interaction somatosensory vehicle 100. For example, the human-machine interaction somatosensory vehicle 100 may include two guiding rails 480. One or more pedal device fixing brackets 1010 may be inserted on each of the guiding rails 480 to mount the pedal devices 120.

Referring to FIG. 4, the guiding rail 480 may have a T-shaped cross section. With such configuration(s), the pedal device fixing bracket 1010 may be inserted into the guiding rail 480 to prevent detachment. In some embodiments, the cross section of the guiding rail 480 may be in other shapes, such as a triangle, a circle, etc., as long as the diameter of the opening of the guiding rail 480 is less than the size of the inner diameter of the guiding rail 480. With such a configuration, the pedal device fixing bracket 1010 does not easily fall off or slip out from the side of the guiding rail 480.

Referring to FIG. 10, the one or more pedal device fixing brackets 1010 may include an insertion part 1040, which may be horizontally (e.g., laterally) inserted into the guiding rail 480, and an installation part 510 extending outward from the guiding rail 480 for mounting and holding the pedal devices 120. With such configuration(s), the pedal device fixing bracket 1010 can be fixed on the support frame 430 while holding the pedal devices 120.

In some embodiments, the installation part 510 may be include a holding hole 1020 for holding the pedal devices 120. With such configuration(s), the holding hole 1020 can hold a connecting component, such as a nut, to achieve a stable connection with the pedal devices 120.

As shown in FIG. 10, a support wing 1030 extending upward and/or downward may be configured between the installation part 510 and the insertion part 1040. With such configuration(s), the support wing 1030 may support the support frame 430 in the vertical direction (e.g., the up-down direction) to improve a strength of the pedal device fixing bracket 1010, and thereby improve the support frame 430's stability for holding the pedal devices 120.

In some embodiments, the support frame 430 may be a circular tube extending along an axial direction of the wheels 130. The guiding rail 480 and the pedal device fixing bracket 1010 may be mounted on the top surface of the support frame 430. With such configuration(s), the support frame 430 can provide better upward support to the pedal device fixing bracket 1010, but this shall not limit the scope of the present disclosure. In some embodiments, the guiding rail 480 and the pedal device fixing bracket 1010 may also be mounted on the side or bottom surface, of the support frame 430, or inside the support frame 430.

In some embodiments, the insertion part 1040 may have a T-shaped cross section. With such configuration(s), the insertion part 1040 can be tightly fit to the guiding rail 480 to improve the holding stability. In some embodiments, a shape of the cross section of the inserted part 1040 corresponding to the guiding rail 480 may be circular, triangular, rectangular, or the like.

Figure 7:
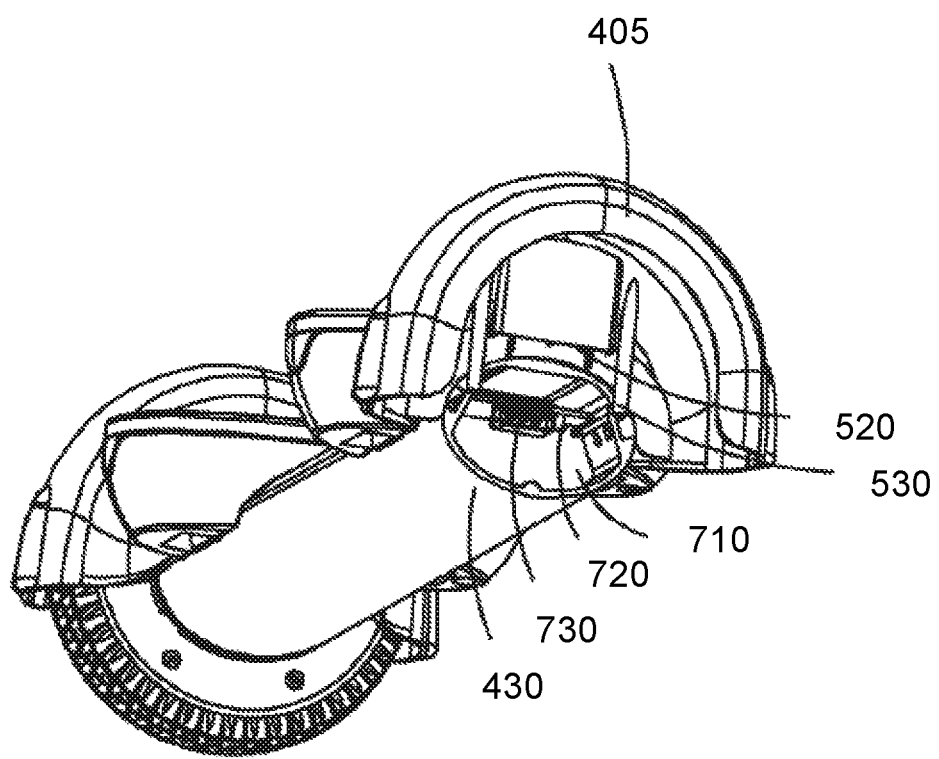
FIG. 7 is a schematic stereogram of a relevant portion of the vehicle body of FIG. 5 according to some embodiments of the present disclosure.

As shown in FIG. 7, the human-machine interaction somatosensory vehicle 100 may further include a power source 710 configured to supply power to the driving device, the first position sensor 810 and the controller 860. The controller 860 may be configured to control the power source 710, the driving device, and the first position sensor 810. The controller 860 may emit a driving signal to the driving device according to the stress information detected by the first position sensor 810 to drive the wheels 130 to rotate.

Figure 14:
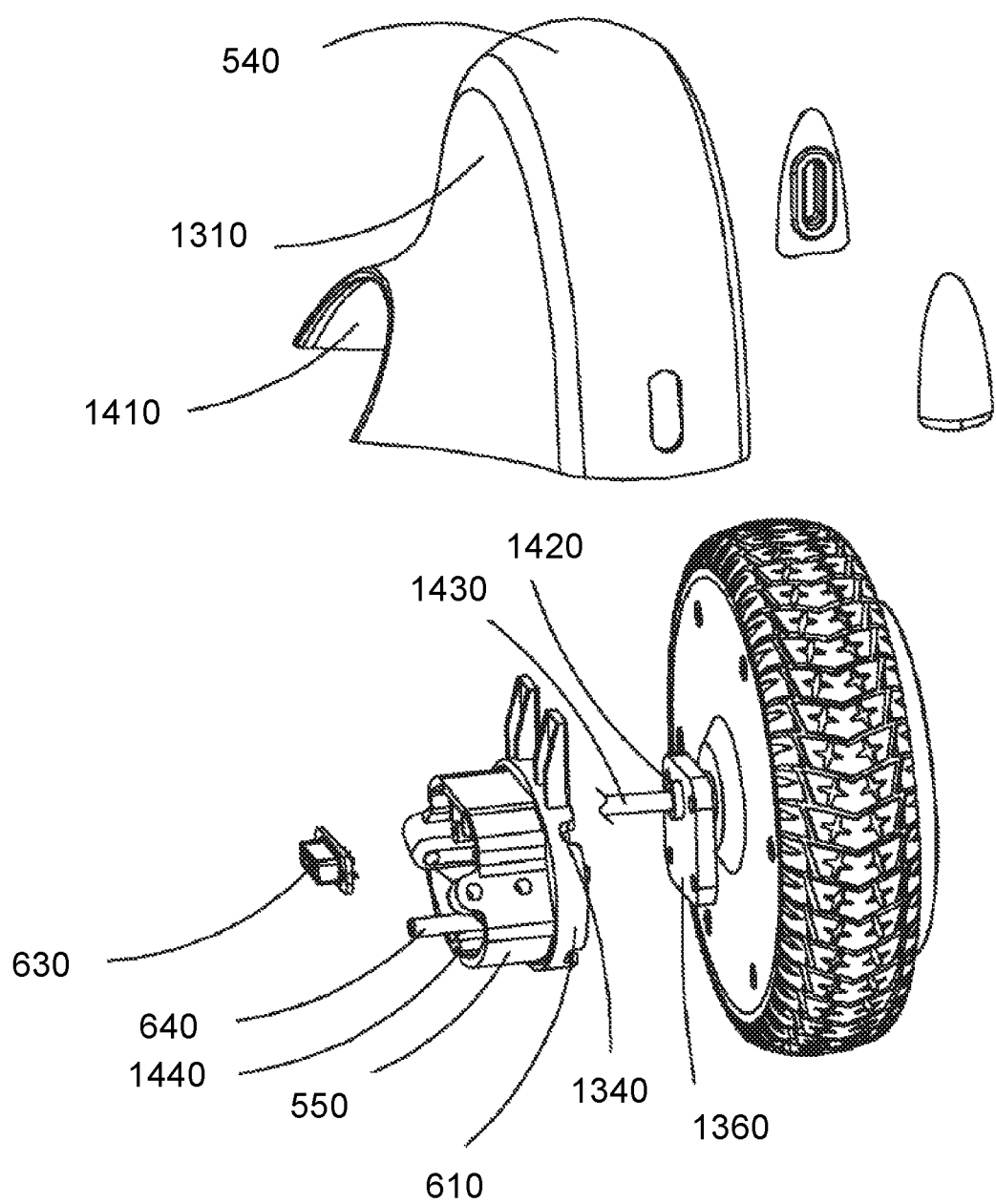
FIG. 14 is an exploded diagram of the relevant portion of the wheel of FIG. 13.

As shown in FIG. 14, a wheel shaft 1420 may be placed between the wheels 130 and the vehicle body 110. The wheels 130 may be rotatably connected to the vehicle body 110 via the wheel shaft 1420. In some embodiments, a center of gravity of the vehicle body 110 may be lower than a center of gravity of the wheel shaft 1420. With such configuration(s), regardless of whether the human-machine interaction somatosensory vehicle 100 is in a running state or a non-running state, the center of gravity of the whole vehicle body 110 may always be suspended below the wheel shaft 1420, which may keep the vehicle body 110 maintained in a steady state without turning over. Even if the vehicle body 110 is turned over upward by an external force, the vehicle body 110 may return to the original position due to the gravity, which may be convenient for the user. The descriptions that the center of gravity of the vehicle body 110 is not lower than the center gravity of the wheel shaft 1420 and the center of gravity of the vehicle body 110 shall not limit the scope of the present disclosure.

In some embodiments, the wheels 130 may be fixedly attached to the wheel shaft 1420. The wheel shaft 1420 and the wheels may together rotate with respect to the vehicle body 110. Alternatively, the wheel shaft 1420 may be fixedly attached to the vehicle body 110, and the wheels 130 may rotate along the wheel shaft 1420.

In some embodiments, one end of the wheel shaft 1420 may be connected to the wheels 130, and the other end of the wheel shaft 1420 may be connected to a wheel shaft fixation plate 1360. The wheel shaft fixation plate 1360 may be connected to the vehicle body 110. With such configuration(s), the wheels 130 can be coupled to the wheel shaft fixation plate 1360 and then connected to the support frame 430, which may facilitate the support frame 430 and the wheels 130 being assembled in a modular way (or referred to as modular assembly).

In some embodiments, the wheel shaft 1420 may be connected to an upper half of the wheel shaft fixation plate 1360. With such configuration(s), after connecting the wheel shaft fixation plate 1360 to the support frame 430, the center of gravity of the vehicle body 110 can be below the wheel shaft 1420.

As shown in FIG. 8, a motor holder 820 that matches with the wheel shaft fixation plate 1360 may be mounted on a side of the support frame 430. The center of gravity of the motor holder 820 may be lower than the center of gravity of the wheel shaft 1420. With such configuration(s), it can be further ensured that the center of gravity of the vehicle body 110 is lower than the wheel shaft 1420. For example, the motor holder 820 may be made of a material of a large density (e.g., metal) to ensure that the center of gravity of the vehicle body 110 is below the wheel shaft 1420 and the vehicle body 110 maintains high stability.

In some embodiments, a seal gasket (not shown in FIG. 8) may be placed between the wheel shaft fixation plate 1360 and the motor holder 820. With such configuration(s), the vehicle body 110 and the wheels 130 can have better dustproofing and/or waterproofing performances.

Figure 5:
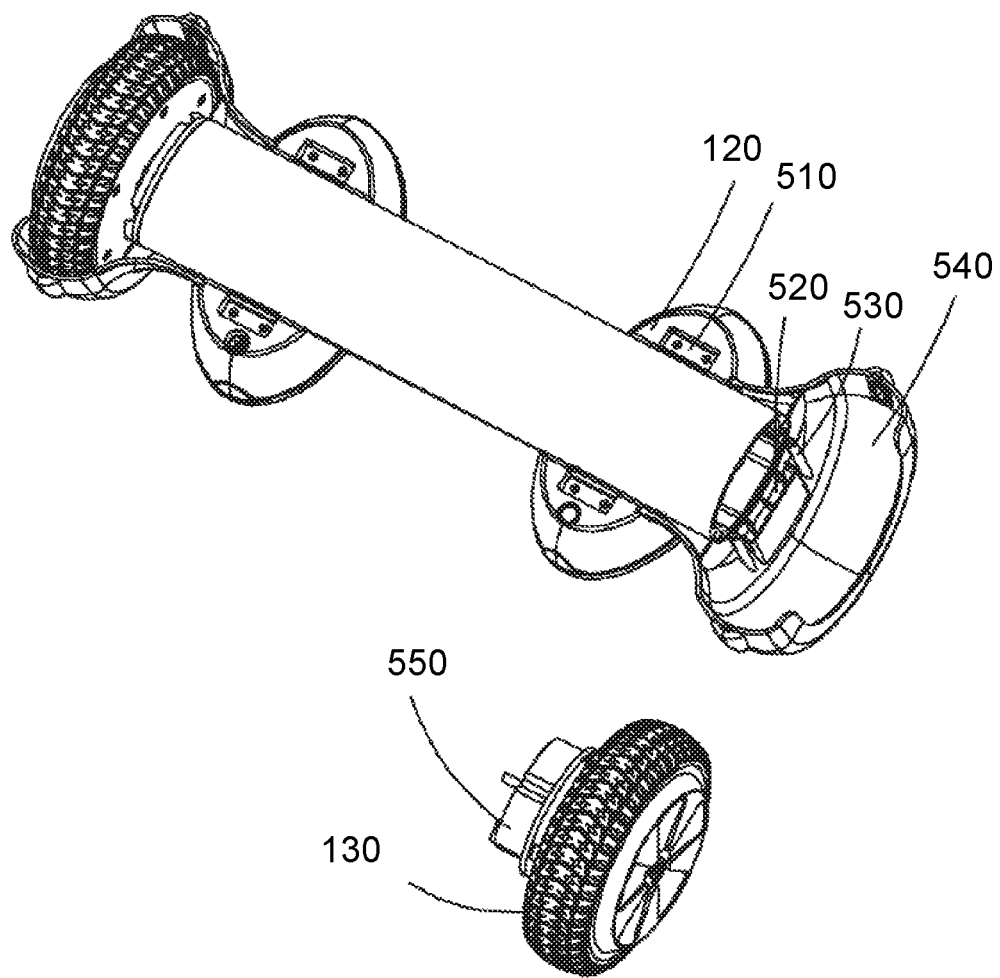
FIG. 5 is a partly exploded stereogram of a wheel of the human-machine interaction somatosensory vehicle according to some embodiments of the present disclosure.
Figure 6:
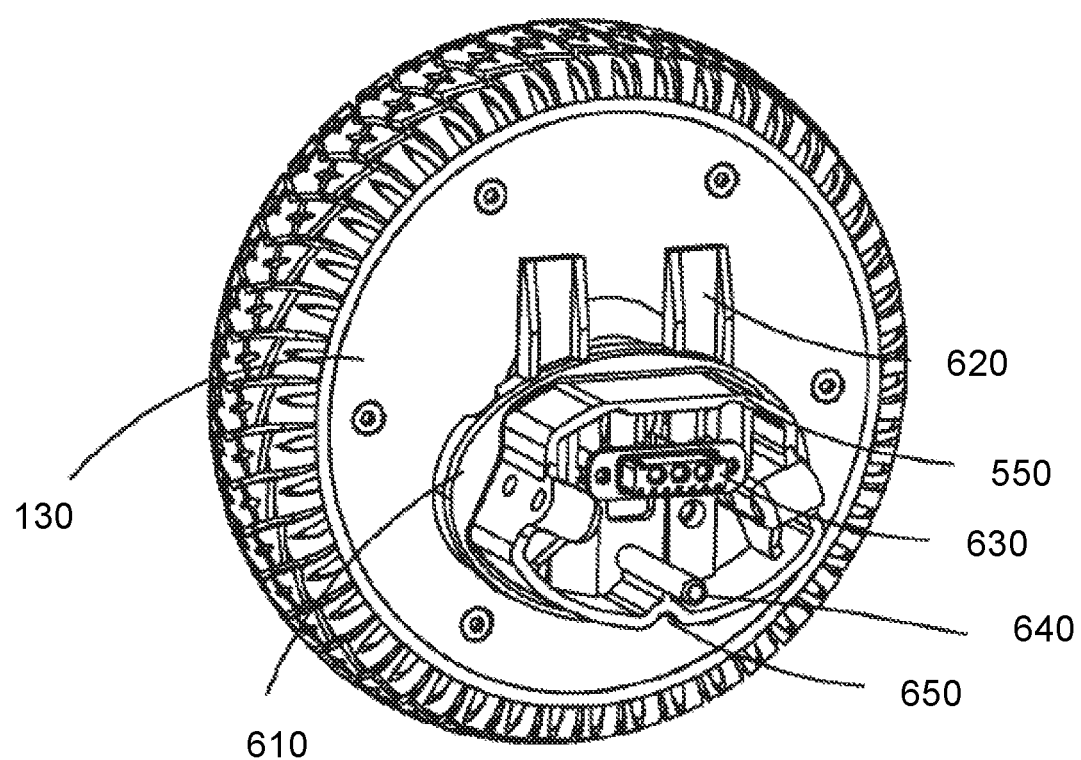
FIG. 6 is a schematic stereogram of the relevant portion of the wheel of FIG. 5 according to some embodiments of the present disclosure.
Figure 16:
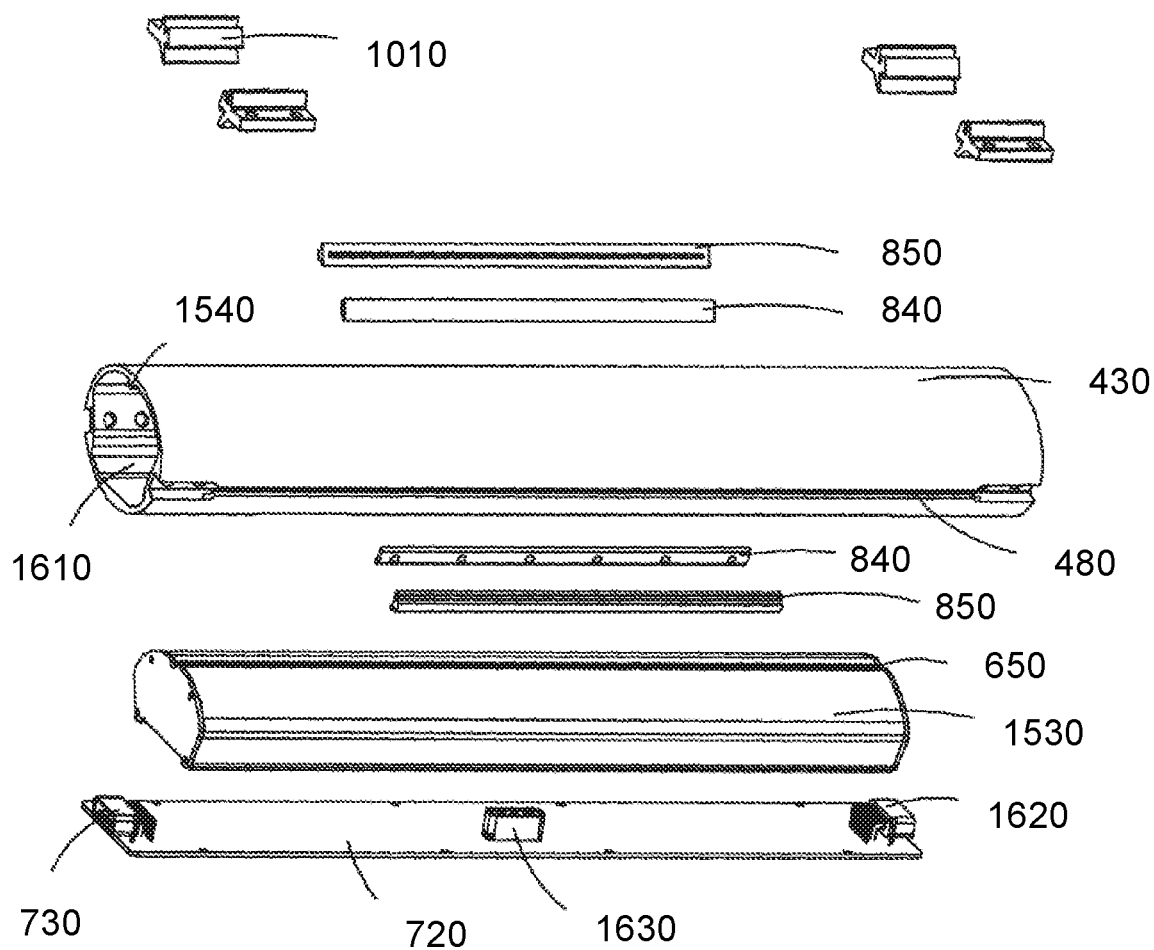
FIG. 16 is an exploded diagram of the relevant portion of the vehicle body of FIG. 15.

As shown in FIGS. 5, 8 and 16, a receiving chamber 1610 that matches with the motor holder 820 may be mounted on the support frame 430. The motor holder 820 may include a plug end 550 configured to be plugged in the receiving chamber 1610. As shown in FIG. 6, the motor holder 820 may also include a cap portion 610 configured to connect to the plug end 550 and seal the receiving chamber. With such configuration(s), the motor holder 820 can be mounted and fixed to the support frame 430 through the plug end 550, and the cap portion 610 can seal the support frame 430.

As shown in FIGS. 6, 7 and 8, the power source 710 may be placed in the receiving chamber 1610. A horizontally protruding position pole 640 may be mounted on the motor holder 820, and the position pole 640 may abut the power source 710 in the receiving chamber 1610. With such configuration(s), the motor holder 820 can prevent the power source 710 from vibrating (e.g., in left-right direction) and improve the structural stability inside the vehicle body 110.

As shown in FIGS. 4 and 6, a wheel cap 405 may be mounted on the wheels 130. A mounting foot 620 may be mounted on the cap portion 610 and fixedly connected to the wheel cap 405 by inserting itself into the wheel cap 405. With such configuration(s), the wheel cap 405 can be stably held by the motor holder 820. In some embodiments, the wheel cap 405 may also be held by the vehicle body 110 through other means.

Figure 15:
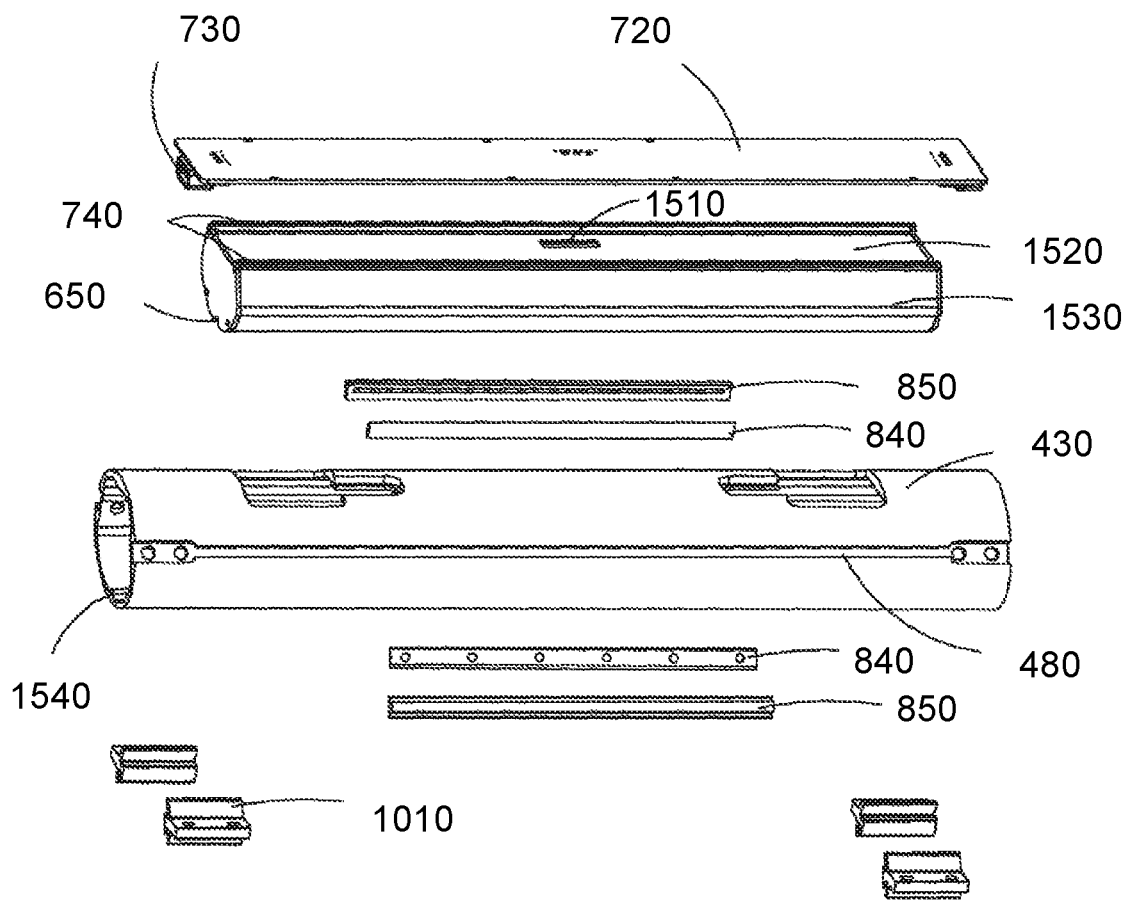
FIG. 15 is an exploded diagram of the relevant portion of the vehicle body of FIG. 8.

As shown in FIG. 15, a limiting protruding component 1540 and a limiting groove 1440 may be configured between the receiving chamber 1610 and the plug end 550 of the motor holder 820. The limiting protruding component 1540 and the limiting groove 1440 may extend in the lateral direction (left-right direction) and be matched with each other. such a configuration may prevent the motor holder 820 from rotating in the receiving chamber 1610. During an assembling process, such a configuration may prevent the motor holder 820 and the receiving chamber 1610 from being reversely mounted, and the limiting protruding component 1540 may also serve as a reinforcing rib to increase the strength of the support frame 430 and improve the structural stability of the vehicle body 110. In some embodiments, the limiting protruding component 1540 may be mounted on the plug end 550, and the limiting groove 1440 may be placed in the receiving chamber 1610.

Figure 13:
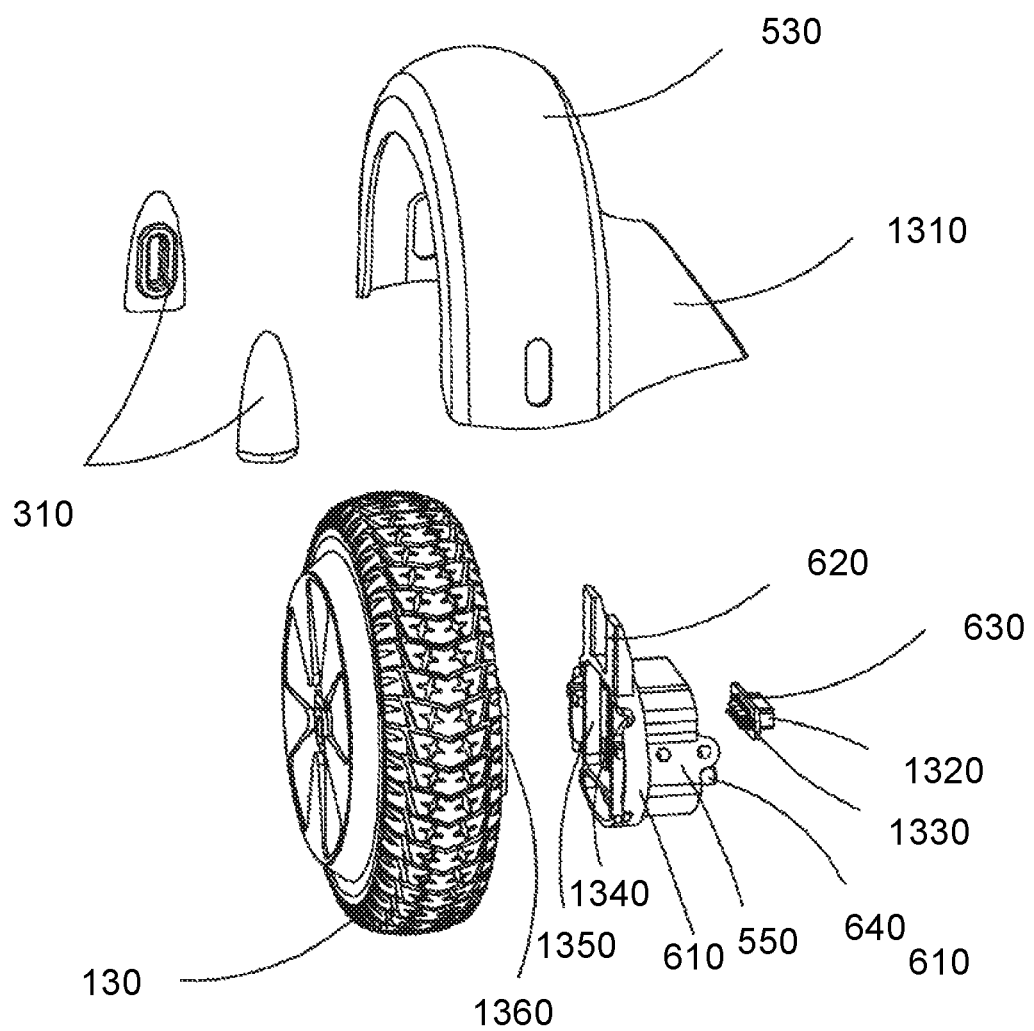
FIG. 13 is an exploded diagram of the relevant portion of the wheel of FIG. 8.

Refer to FIG. 13, the wheel shaft fixation plate 1360 may be perpendicular to the axial direction of the wheel shaft 1420. With such configuration(s), the wheel shaft fixation plate 1360 can be less likely to be deflected by a force in the horizontal direction (e.g., the front-rear direction) and/or the vertical direction (e.g., up-down direction) of the vehicle body 110, hence the fixation stability between the wheel shaft fixation plate 1360 and the vehicle body 110 may be improved. In some embodiments, the wheel shaft fixation plate 1360 may be non-perpendicular to the axial direction of the wheel shaft 1420.

As shown in FIG. 14, the driving device may be placed in the wheels 130, and a cable 1430 connected to the driving device may be placed in the wheel shaft 1420. The cable 1430 may extend out of the wheel shaft fixation plate 1360 to be connected to the controller 860 and/or the power source 710. With such configuration(s), the driving device within the wheels 130 can be connected to the controller 860 and/or the power source 710 via the cable 1430 passing through the wheel shaft fixation plate 1360. The driving device may be a motor. In some embodiments, the driving device may also be placed in the vehicle body 110.

As shown in FIG. 13, a receiving groove 1350 may be mounted on the motor holder 820 to accommodate and hold the wheel shaft fixation plate 1360. With such configuration(s), the wheel shaft fixation plate 1360 can be accommodated and positioned in the receiving groove 1350 to improve flatness of an outer surface of the vehicle body 110. In some embodiments, the motor holder 820 may be manufactured together with a portion of the support frame 430 or the entire support frame 430 as a single piece.

In some embodiments, the wheel shaft fixation plate 1360 may be rectangular, and the shape of the receiving groove 1350 may be rectangular as well corresponding to the wheel shaft fixation plate 1360. Alternatively, other shapes may also be used. With such configuration(s), the receiving groove 1350 can be plugged and positioned to the wheel shaft fixation plate 1360 to prevent the wheel shaft fixation plate 1360 from moving or rotating.

As shown in FIG. 4, the pedal devices 120 may further include a pedal foot board 445 located above the first position sensor 810. The first position sensor 810 may include two sensing component regions 460 located on the front and the rear of the pedal foot board 445, respectively. Second force receiving portions 465 may be located at adjacent ends of the two sensing component regions 460 to directly or indirectly abut the support frame 430. First force receiving portions 455 may be located at relatively far ends of the two sensing component regions 460 to directly or indirectly abut the pedal foot board 445. With such configuration(s), when the pedal foot board 445 is stepped down, the first force receiving portion 455 on the front and rear sides can receive a downward force, and the second force receiving portion 465 may receive an upward supporting force. The supporting force may cause the first position sensor 810 to exhibit an upward arching deformation, and the deformation may be detected by the sensing component regions 460. The deformation may include a macroscopic deformation or a microscopic deformation. A bottom surface of the first force receiving portion 455 may be suspended so that when the pedal foot board 445 is subjected to a pedaling force, the first force receiving portion 455 may have a downward moving space, so that the sensing component region 460 may be easily arched upward. The deformation may be interpreted as a macroscopic deformation or a microscopic deformation. An upper portion of the second force receiving portion 465 may be suspended. In some embodiments, a first gap 410 may be configured between the pedal foot board 445 and the sensing component region 460. The first gap 410 may provide space for the sensing component region 460 in the first position sensor 810 to arch upward. In some embodiments, the first force receiving portion 455 may abut the support frame 430. The second force receiving portion 465 may abut the pedal foot board 445. The bottom surface of the second force receiving portion 465 may be suspended, and the top surface of the first force receiving portion 455 may be preferably suspended. The situation of deformation of the sensing component region 460 may be similar to the above-mentioned descriptions and is not repeated herein. It should be noted that the locations of the two sensing component regions 460 under the same pedal foot board 445 may not be limited to the front and rear regions of the pedal foot board 445 but may also include left and right regions of the pedal foot board 445.

In some embodiments, if a component directly abuts another component, it may mean that the two components directly contact each other and there are no other components located between the two components. If a component indirectly abuts another component, it may mean that the two components do not directly contact each other and there are one or more other components located between the two components for transmitting a force between the two components. For example, a sensor holder 470 may be mounted between the second force receiving portion 465 and the support frame 430 to cause the second force receiving portion 465 to indirectly abut the support frame 430.

As shown in FIG. 4, the pedal devices 120 may include a sensor holder 470 directly holding the second force receiving portion 465. The sensor holder 470 may directly or indirectly hold the support frame 430. With such configuration(s), the first position sensor 810 can be held by the sensor holder 470 and then mounted on the support frame 430 to protect the first position sensor 810 during an installation process. It should be noted that a second gap 420 may be configured between the sensor holder 470 and the sensing component region 460 in order to provide a downward deformation space for the sensing component region 460.

Figure 17:
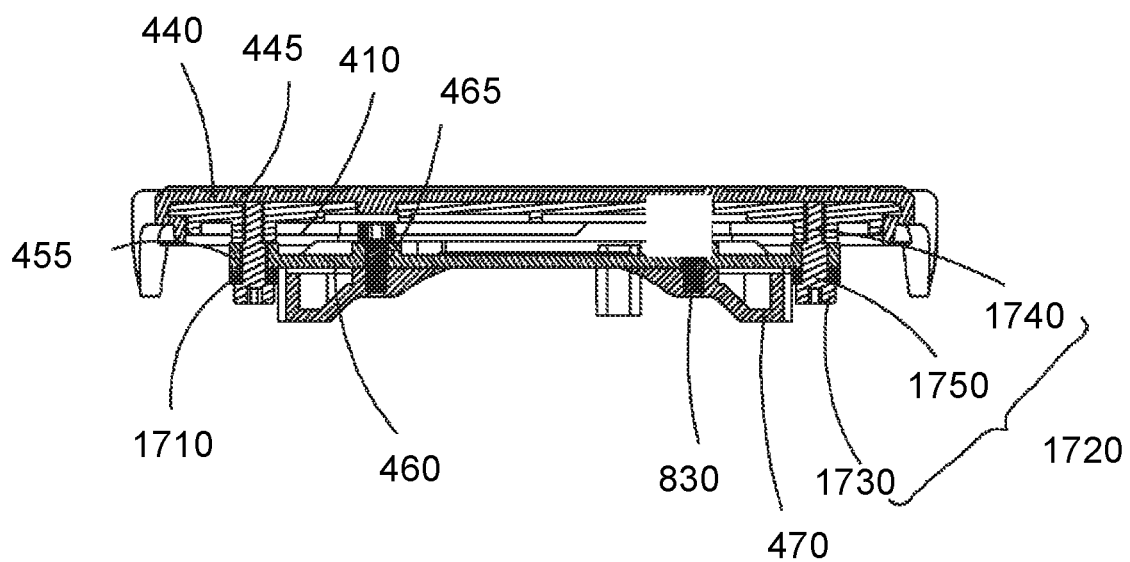
FIG. 17 is a cross-sectional view of the pedal device of FIG. 1 and shows the fixing components.

As shown in FIGS. 4 and 17, a first through hole 450 may be configured on the first force receiving portion 455. A second through hole 435 may be configured on the second force receiving portion 465. In some embodiments, a first mounting hole 415 may be configured on the pedal foot board 445 and a second mounting hole 425 may be configured on the sensor holder 470. The first force receiving portion 455 may be mounted on the pedal foot board 445 and abut the pedal foot board 445 by a first fixing component 1720 (as shown in FIG. 17) penetrating through the first through hole 450 and locked into the first mounting hole 415. The second force receiving portion 465 may be mounted on the sensor holder 470 and abut the sensor holder 470 by a second fixing component 830 (as shown in FIG. 8) penetrating through the second through hole 435 and locked into the second mounting hole 425.

As shown in FIG. 17, the first fixing component 1720 may include a screw 1730, a nut 1740, and a connecting rod 1750 configured to connect the screw 1730 and the nut 1740. The connecting rod 1750 may include a rod body with a smooth side, and the connecting rod 1750 may be placed in the first through hole 450. When the first fixing component 1720 is in use, the connecting rod 1750 and the first through hole 450 may be in a smooth contact, which can reduce the friction between the connecting rod 1750 and the first through hole 450 and may avoid the deformation of the sensing component region 460 caused by damage to the first through hole 450 due to excessive friction.

In some embodiments, the diameter of the connecting rod 1750 may be slightly less than the inner diameter of the first through hole 450, which may further reduce the frictional force between the connecting rod 1750 and the first through hole 450 while not affecting the installation of the first force receiving portion 455 on the pedal foot board 445 via the first fixing component 1720.

In some embodiments, a gasket assembly 1710 may be inserted between the nut 1740 and the first force receiving portion 455. The gasket assembly 1710 may prevent the sensing component region 460 from a deformation caused by a received force of the first force receiving portion 455 when the first fixing component 1720 mounts the first force receiving portion 455 on the pedal foot board 445.

It should be noted that the second fixing component 830 may be mounted as a component of the first fixing component 1720 or may be an ordinary bolt. A gasket assembly may also be mounted between an end of the second fixing member 830 and the second force receiving portion 465.

In some embodiments, the first position sensor 810 may be, for example, a stress sensor. The first position sensor 810 may include two end portions 1110 (e.g., a front end portion and a rear end portion) and a connect portion 1120 connecting the two end portions 1110. As shown in FIG. 4, each of the end portions 1110 may include the second force receiving portion 465, the first force receiving portion 455, and the sensing component region 460 located between the second force receiving portion 465 and the first force receiving portion 455. With such configuration(s), the front and rear end portions 1110 can detect different stress information according to different forces of the front and the rear portions of the feet (or soles) stepped on the pedal devices 120, respectively. In other words, the two sensing component regions 460 may also be understood as two different stress sensors to detect different forces of the front and rear portions of the feet or soles, respectively. When the two sensing component regions 460 are connected by the connect portion 1120 and an end portion 1110 receives a force, the other end portion 1110 may have a tendency to be tilted. The end portion may have a tendency to be tilted upward and the sensing component region 460 in the other end portion 1110 may be recessed downward and generate a negative stress, which may facilitate the determination of a stress difference via the two sensing component regions 460. This may improve the accuracy and sensitivity of the pressure collected by the first position sensor 810 and facilitate the control of the output force of the driving device through the first position sensor 810.

Generally, two sensing component regions 460 may be mounted on a same pedal device 120 to detect the pressure information of a foot. Stress received by two portions of the pedal devices 120 (e.g., the front portion and rear portion of the pedal devices 120) and detected by the two sensing component regions 460 may be the stress information of the same foot on a pedal device. Further, the difference of the stress detected by the two sensing component regions 460 may be the stress information of the same foot on the same pedal device 120. In other words, for the first position sensor 810, the stress information may be the stress values detected by two sensing component regions 460 of the first position sensor 810, and received by the controller 860. The controller 860 may determine the difference between the two stress values, and each of the pedal devices 120 may correspond to a stress value. The controller 860 may drive the wheels 130 to rotate according to the relationship between the two force difference values, that is, the stress information, and then drive the vehicle body 110 of the human-machine interaction somatosensory vehicle 100 to move or make a turn.

In some embodiments, when the stress information of the two pedal devices 120 are the same, the controller 860 may control the driving device to output a same driving force to the two wheels 130, so that the two wheels 130 may rotate at the same speed to move the vehicle body 110. As used herein, the stress information may refer to a stress difference value, and the stress difference value may not refer to an absolute value of a pressure difference (e.g., the stress difference can be either a negative value, zero, or a positive value). For example, for a pedal device 120, when the stress received by the front portion is larger than the stress received by the rear portion, the stress difference value may be recorded as a positive value When the stress received by the rear portion is larger than the stress received by the front part, the pressure difference value may be recorded as a negative value. In a special case, when the vehicle body 110 is in an equilibrium state, the rotation speed of the two wheels 130 may be zero, and the vehicle body 110 may be still. When the stress information of the two pedal devices 120 is different, the controller 860 may control the driving device to output different driving forces to the two wheels 130. One of the wheels 130 may receive a greater driving force than the other wheel 130, so that the rotational speeds of the two wheels 130 may be different. Therefore, the moving speed of one of the wheels 130 may be greater than the speed of the other wheel 130, which may drive the vehicle body to make a turn. It should be noted that the first position sensor 810 may merely control the rotation of the wheels 130 to drive the vehicle body to move or make a turn, and the rotational speed of the wheels 130 may need to be controlled by other sensors. Detailed descriptions of how the controller 860 controls the driving device to output the same driving force are described below.

In some embodiments, the human-machine interaction somatosensory vehicle 100 may further include a second position sensor (not shown in FIGS. 1-17) configured to detect tilting information of the support frame 430 with respect to the wheels 130. With such configuration(s), when the user stands on the pedal devices 120, the stress information of the two pedal devices 120 can be the same. When the user leans forward, the entire support frame 430 may be caused to tilt forward. The second position sensor may detect the titling information of the support frame 430 and send a signal including the titling information of the support frame 430 to the controller 860, and the controller 860 may control the driving wheels 130 to move forward to generate a backward tilting force to balance the human-machine interaction somatosensory vehicle 100. In addition, the larger a tilt angle detected by the second position sensor is, the larger the driving force may be. Specifically, the second position sensor may include a gyroscope, an acceleration sensor, and/or a photoelectric sensor. It should be noted that when the user leans backward, the wheels 130 may move backward. The principle of the backward motion may be the same as the principle of the forward motion, and for brevity, details are not repeated herein.

In some embodiments, the two sensing component regions 460 configured to detect the stress information caused by a foot (or a sole) may be mounted on the same pedal device 120. In some embodiments, the first position sensor 810 may merely include one sensing component region 460, which means that the first position sensor 810 may detect stress information related to different portions of the same foot of the user. The controller 860 may be configured to drive the wheels 130 to move or make a turn according to the pressure difference between the two first position sensors 810. With such configuration(s), when the stress information of the two pedal devices 120 are the same, the two wheels 130 may move at the same speed. When the stress information of the two pedal devices 120 are different, the rotational speed of one of the wheels 130 may be greater than the rotational speed of the other wheel 130. Thus, the human-machine interaction somatosensory vehicle 100 may make a turn. Alternatively, the directions of rotation of the wheels 130 may be opposite in order to make a turn.

In some embodiments, the first position sensor 810 may be I-shaped, and the width of a connect portion 1120 may be less than the width of an end portion 1110 in the lateral direction. With such configuration(s), the connect portion 1120 may fix two second force receiving portions 1312 in the front and rear of the pedal devices 120 to strengthen a strength of the first position sensor 810, and a narrow connect portion 1120 may reduce weight of the first position sensor 810. It is also possible that the first position sensor 810 has a better elasticity to improve the sensing sensitivity. In some embodiments, the shape of the first position sensor 810 may not be limited to the I-shape. For example, a circular weight sensor may be used. In some embodiments, the pedal devices 120 may further include a bottom shell 475 between the sensor holder 470 and the vehicle body 110. With such configuration(s), a flatness of an outer structure of the vehicle body 110 can be improved, and the protection and aesthetic effects can be achieved.

As shown in FIG. 4, a footpad 440 may be mounted above the pedal foot board 445, and the footpad 440 may be closely connected to the bottom shell 475. The footpad 440 may be made of a material such as soft rubber to increase abrasive resistance and friction of the footpad 440, improve the user's comfort of using the human-machine interaction somatosensory vehicle 100, and improve waterproof and dustproof performances.

Referring to FIG. 3, the pedal devices 120 may be elliptical. With such configuration(s), the security and aesthetic effects may be improved. Alternatively, the pedal devices 120 may also have other shapes. In some embodiments, the support frame 430 may have a tubular shape extending along an axial direction of the wheels 130. The width of the pedal devices 120 may be wider than the width of the support frame 430 in the front-rear direction of the vehicle body 110. The bottom surface of the pedal devices 120 may be recessed upward to accommodate a part of the support frame 430. With such configuration(s), the structural stability of the vehicle body 110 can be improved.

In some embodiments, a wheel cap 405 configured to cover the wheels 130 may be mounted on a side of the pedal foot board 445. The wheel cap 405 and the pedal foot board 120 may be mounted separately. With such configuration(s), it may be convenient to implement the manufacturing process of the wheel cap 405 and the pedal foot board 445. In some embodiments, the pedal devices 120 and the wheel cover 405 may be manufactured together as a single piece. In some embodiments, the wheel cap 405 and some or all components of the pedal devices 120 may be manufactured together as a single piece.

As shown in FIG. 7, the controller 860 may include a main control board 720 placed horizontally in the tubular support frame 430. The shape of cross-section of the support frame 430 may not be limited to a circular shape. For example, the support frame 430 may include a long-cavity tube with a cross section in other shapes. With such configuration(s), the main control board 720 can better utilize a space of the longitudinal receiving chamber 1610 in the tubular support frame 430 to improve space utilization. In some embodiments, the main control board 720 may be mounted on the support frame 430 in other ways.

In some embodiments, a power source 710 may be placed in the support frame 430, and a battery docking interface 1630 (as shown in FIG. 16) configured to be connected to the power source 710 may be mounted on the main control board 720. A battery interface 1510 corresponding to the battery docking interface 1630 may be mounted on the power source 710. With such configuration(s), the power source 710 and the main control board 720 can be connected through a modular interface, which can avoid excessive cables 1430. For instance, the cables 1430 may be integrated in the battery interface 1510 and the battery docking interface 1630, which may prevent the cables 1430 from contacting excessive air and avoid problems such as the aging of the cable 1430. Thus, the safety may be improved (e.g., the risk of fire due to aged cable may be reduced).

In some embodiments, the battery docking interface 1630 may be located in the middle of the main control board 720 along the lateral direction. With such configuration(s), the balance of the main control board 720 can be improved, and the assembly stability may be improved. In some embodiments, the battery docking interface 1630 may be located in other places.

In some embodiments, external docking interfaces 730 configured to be connected to the driving device on both sides may be mounted on left and right ends of the main control board 720. Such a configuration may facilitate the external docking interface 730 to be connected to the interface of the driving device and/or the interface of the first position sensor 810, which is advantageous for assembling in modular ways (or refer to as modular assembly).

In some embodiments, a connector 630 electrically connected to the driving device and the external docking interface 730 may be placed between the support frame 430 and the wheels 130. The connector 630 may be electrically connected to the external docking interface 730 to assemble the driving device and the vehicle body 110 in a modular way.

In some embodiments, the external docking interface 730 may be located at both ends of the power source 710 along the lateral direction. With such configuration(s), the external docking interface 730 can better utilize the remaining space at both ends of the power source 710 in the support frame 430 to facilitate docking with the motor and improve the space utilization inside the support frame 430.

In some embodiments, the main control board 720 may be horizontally mounted on the internal top side of the support frame 430, and the power source 710 may be located below the main control board 720. With such configuration(s), the main control board 720 can be better protected from being squeezed.

In some embodiments, supporting ribs 740 configured to support the main control board 720 may be mounted on front and rear sides of the power source 710 and may extend horizontally. Between the supporting ribs 740, a groove may be configured between the main control board and the power source. With such configuration(s), the main control board 720 can be supported and fixed, and components on the main control board 720 can be protected from being squeezed.

In some embodiments, the main control board 720 may extend horizontally (e.g., in the left-right direction). With such configuration(s), the main control board 720 can utilize the space above the internal top side of the tubular support frame 430 to improve space utilization.

In some embodiments, a connection component may be placed in the human-machine interaction somatosensory vehicle 100. The connection component may include a power source connection component, a Hall connection component, a temperature connection component configured to transmit temperature signals, or the like, or any combination thereof. With such configuration(s), the temperature connection component can be used to transmit the temperature signals of the human-machine interaction somatosensory vehicle 100 to the controller 860. When the temperature of the corresponding component of the human-machine interaction somatosensory vehicle 100 reaches a certain level, a corresponding protection program such as a shutdown operation may be initiated, which may improve safety of the human-machine interaction somatosensory vehicle 100.

In some embodiments, the connection component may be a cable or a plug end. With such configuration(s), the signal transmission can be achieved. It should be understood that the plug end and the cable described herein may not be limited to the plug end 1330 (as shown in FIG. 13) mounted between the power source 710 and the driving device and the cable 1430 (as shown in FIG. 14). For example, other types or structures of cables and/or plug ends may be used. In some embodiments, when the connection component is a cable, the connection component may include 5 Hall wires, one or two temperature wires, and 3 power source wires. When the connection component is a plug end, the connection component may include 3 power source plug ends, 5 Hall plug ends, 1 or 2 temperature plug ends. In some embodiments, some of the connection components may be cable(s) while some of the connection components may be plug end(s). In some embodiments, the plug end 1330 may include a power source plug end but no Hall plug end, and the connection function of the Hall plug end may be realized by adding a battery communication wire.

In some embodiments, a power source 710 may be placed in the support frame 430. A temperature sensor (not shown in the FIGS. 1-17) may be embedded into the power source 710 for monitoring the internal temperature of the power source 710. The temperature connection components may be connected to the temperature sensor. With such configuration(s), the temperature of the power source 710 can be detected, and the safety can be improved. For instance, when the internal temperature is abnormally high, there may be a risk of causing damage to the power source 710 and/or the human-machine interaction somatosensory vehicle 100. In response to a determination that the internal temperature of the power source 710 detected by the temperature sensor is greater than a threshold (e.g., 45 degrees, 60 degrees), the main control board 720 may output a signal to warn the user and/or to power off the human-machine interaction somatosensory vehicle 100.

In some embodiments, a wheel shaft 1420 may be configured between the wheels 130 and the vehicle body 110, and the wheels 130 may be rotatably connected to the vehicle body 110 through the wheel shaft 1420. The driving device may be placed in the wheels 130. The driving device may be a driving motor, and the main control board 720 may include a driving circuit (not shown in FIGS. 1-17) for controlling the driving device. The cable 1430 connected to the driving device may be placed in the wheel shaft 1420. The cable 1430 may extend out of the wheel shaft 1420 to be connected to a connector 630. With such configuration(s), the power source connection component, the Hall connection component, and the temperature connection component can be placed between the driving device and the connector 630. In some embodiments, the driving device may not include temperature sensor and the temperature connection component may be omitted as well.

In some embodiments, the connector 630 may include a frame 1320 and the plug end 1330 connected to the cable 1430 may be located in the frame 1320. In some embodiments, the power source 710 may be connected to an external docking interface 730. The external docking interface 730 and the connector 630 may be connected to each other. With such configuration(s), the connector 630 may be connected to the external docking interface 730, which can improve a modular assembly degree between the driving device and the power source 710 (e.g., the modular assembly degree may refer to the easiness of being assembled in a modular way).

Further, the power source 710 and the external docking interface 730 may be connected through the main control board 720. A battery docking interface 1630 and a battery interface 1510 may be mutually plugged in for connection. The battery docking interface 1630 and the battery interface 1510 may be mounted between the power source 710 and the main control board 720. The external docking interface 730 may be mounted on the main control board 720. The external docking interface 730 may be connected to the power source 710 through the main control board 720. With such configuration(s), the modular assembly degree between the main control board 720 and the power source 710 can be improved.

In some embodiments, a wheel cap 405 may be mounted outside the wheels 130. An anti-collision rubber 310 may be attached to the wheel cap 405 (as shown in FIG. 3 and FIG. 4, respectively). With such configuration(s), the wheel cap 405 may be better protected during the use of the human-machine interaction somatosensory vehicle 100. Specifically, the anti-collision rubber 310 may be mounted on an outer side of the wheel cap 405 and may protrude outward. With such configuration(s), the structure may be simple, and the assembly may be convenient. In some embodiments, the anti-collision rubber 310 may be embedded in an interior of the wheel cap 405. A material with buffer and abrasive resistance but different from the material of the wheel cap 405 may be used for the anti-collision rubber 310, which may save the material cost.

As described in FIG. 3, the anti-collision rubber 310 may be located on the front and rear sides of the wheel cover 405. With such configuration(s), the cost of materials can be saved. Merely by way of example, the anti-collision rubber 310 may be mounted on other portions of the vehicle body 110. In some embodiments, the wheel cap 405 may be mounted on the vehicle body 110. The vehicle body 110 may include a motor holder 820 between the wheels 130 and the support frame 430. The motor holder 820 may be configured to position the wheels 130 via a pivot.

In some embodiments, a mounting foot 620 configured to be fixedly connected to the wheel cap 405 may be mounted above the motor holder 820. A mounting slot 520 recessed upward and configured to accommodate the mounting foot 620 may be mounted below the wheel cap 405. With such configuration(s), the wheel cover 405 can achieve stable attachment to the motor holder 820, the structure may be simple, and the assembly can be stable.

In some embodiments, a fixing column 530 protruding from the top to the bottom on the front and rear sides of the slot 1230 may be mounted under the wheel cap 405. A fixing groove 313 recessed downward, located on the front and rear sides of the mounting foot 620 and configured to connect and accommodate the fixing column 530 may be mounted on the motor holder 820. With such configuration(s), the stability between the wheel cover 405 and the motor holder 820 can be improved.

Dimensions of the support frame 430 in the horizontal direction (e.g., the front-rear direction) and/or the vertical direction (e.g., the up-down direction) may be less than a diameter of the wheels 130. Additionally, the support frame 430 may be a circular tube extending along an axial direction of the wheels 130. A wheel cover portion 540 may be configured to shield the wheels 130. The extension portion 1310 may extend from the wheel cover portion 540 toward the support frame 430 in a streamlined shape. Therefore, the extension portion 1310 may provide better dustproof and waterproof performances between the wheels 130 and the vehicle body 110, and the structure of the human-machine interaction somatosensory vehicle 100 may be smoother, which may make it convenient for the user to clean the human-machine interaction somatosensory vehicle 100.

In some embodiments, a mounting notch 1410 may be formed on the extension end of the extension portion 1310. The mounting notch 1410 may match with the support frame 430. With such configuration(s), the structural stability of the human-machine interaction somatosensory vehicle 100 can be improved.

In one embodiment, a recessed guiding rail 480 may be mounted on the support frame 430, and a strip light 840 (as shown in FIG. 8) may be mounted on the guiding rail 480. With such configuration(s), the installation of the strip light 840 can be simple. The strip light 840 may cause the human-machine interaction somatosensory vehicle 100 to have a better warning and recognition function during the use and may improve the traffic safety of the user.

In some embodiments, the guiding rail 480 may extend in the left-right direction and be mounted on the front side and/or the rear side of the support frame 430. With such configuration(s), the strip light 840 can be mounted on the front side and/or the rear side of the support frame 430.

In some embodiments, a pedal device fixing bracket 1010 for mounting and holding the pedal devices 120 may be further inserted into the guiding rail 480. With such configuration(s), the pedal device fixing bracket 1010 and the strip light 840 can share one guiding rail 480, which may be convenient to manufacture.

In some embodiments, a pedal device fixing bracket 1010 for mounting and holding the left and right pedal devices 120 may be mounted on the left and right ends of the guiding rail 480, respectively. During an assembly process, the strip light 840 may be inserted into the guiding rail 480, and the one or more pedal device fixing brackets 1010 may be inserted into the guiding rail 480 on both sides of the strip light 840.

In some embodiments, a fixing strip 850 configured to be inserted into the guiding rail 480 may be fixedly connected to the rear side of the strip light 840. With such configuration(s), the strip light 840 and the fixing strip 850 can be separately produced and assembled together to facilitate the manufacture of the strip light 840.

In some embodiments, the guiding rail 480 may have a T-shaped cross section. The fixing strip 850 may also have a T-shaped cross section. With such configuration(s), the fixing strip 850 can be closely matched with the guiding rail 480 to improve the holding stability between the strip light 840 and the support frame 430. In some embodiments, the cross section may also have other shapes, as long as the cross section can ensure that the insertion does not detach easily.

The support frame 430 may be a circular tube extending along an axial direction of the wheels 130. The guiding rail 480, the pedal device fixing bracket 1010, and the strip light 840 may all be located in the upper half of the support frame 430. With such configuration(s), the support frame 430 can provide better upward support to the pedal device fixing bracket 1010. In some embodiments, the guiding rail 480, the pedal device fixing bracket 1010 and the strip light 840 may be located in the middle or lower half of the support frame 430.

In some embodiments, a longitudinal power source 710 extending along an axial direction of the wheel 130 may be placed in the support frame 430. The power source 710 may include a battery case 1530. The battery case 1530 and the support frame 430 may be made of metal. The battery case 1530 made of metal may make protect the power source 710 from explosion, while the support frame 430 of the metal material may further protect the power source 710 from explosion. The double-layer metal material protection may greatly improve the safety of the human-machine interaction somatosensory vehicle 100 and avoid accidents caused by the explosion of the power source 710.

In some embodiments, the support frame 430 may be an aluminum tube. In some embodiments, the support frame 430 may be made of other metal materials.

In some embodiments, a matching limiting groove 650 (as shown in FIG. 6) and a limiting protruding component 1540 (as shown in FIG. 15) may be mounted on the battery case 1530 and the support frame 430, respectively (or vice versa). This may facilitate the positioning between the power source 710 and the support frame 430 and prevent a mutual displacement between the power source 710 and the support frame 430. The overall stability can be improved, and incorrect assembly can be prevented.

In some embodiments, dimensions of the support frame 430 in the front-rear direction and/or the up-down direction of the vehicle body 110 may be less than a diameter of the wheels 130. With such configuration(s), the vehicle body 110 can have a relatively small size in the front-rear direction and/or the up-down direction, which can save the cost for the human-machine interaction somatosensory vehicle 100 and make the human-machine interaction somatosensory vehicle 100 portable.

In some embodiments, the support frame 430 may be a circular tube extending along an axial direction of the wheels 130. With such configuration(s), the support frame 430 can have a smaller surface area, which may save material cost and allow the vehicle body 110 to be lighter and more compact. Additionally, the surface of the support frame 430 may be smooth and the support frame 430 may not cause damage to the user or surrounding objects. In some embodiments, the cross-section of the support frame 430 along the wheel shaft 1420 may be polygonal (e.g., rectangular), elliptical, irregular, or the like. The longitudinal power source 710 may have a circular cross-section along the axial direction of the wheels 130 matched with the cross-section of the support frame 430.

In some embodiments, the pedal devices 120 and the support frame 430 may be fixedly connected. The first position sensor 810 may be used to detect the stress information on the pedal devices 120.

In some embodiments, the first position sensor 810 may be configured to detect whether there is a user standing on the pedal devices to control the start and stop of the wheels 130. With such configuration(s), there may be no need to set up a sensing switch, and thus the structure of the vehicle body 110 can be simplified. In some embodiments, a sensing switch may be mounted separately.

In some embodiments, the driving device may be placed in the wheels 130, so that the driving device may use the existing volume of the wheels 130 and not occupy extra spaces. With such configuration(s), the space utilization rate can be relatively high. In some embodiments, when the wheels 130 are relatively small, the driving device may also be placed in the support frame 430.

In some embodiments, the pedal devices 120 may include a pedal foot board 445 and a footpad 440 located above the pedal foot board 445. The first position sensor 810 may be mounted under the pedal foot board 445. With such configuration(s), the user can step on the footpad 440, and the footpad 440 may meet requirements for skid resistance and/or comfort.

In some embodiments, the pedal devices 120 may be deflected outward with respect to the front-rear direction. With such configuration(s), a distance between the two tiptoes of the user can be wider than a distance between the two heels of the user, which can increase the comfort of the user. In some embodiments, the pedal devices 120 may not be deflected (e.g., the pedal devices 120 may be parallel to the front-rear direction).

The human-machine interaction somatosensory vehicle 100 in the present disclosure may include only one supporting tubular support frame 430 between the two wheels 130. The pedal devices 120 may be separately mounted on the support frame 430, and thus there is no need to set two rotatably connected components for mounting the pedal devices 120. The structure of the human-machine interaction somatosensory vehicle 100 may be simple. The vehicle body 110 may be an integral structure and may be extendable. There is no need for a steering pole. In some embodiments, the vehicle body 110 may be designed to be stronger or simpler/more complex than those described in the present disclosure.

Figure 18:
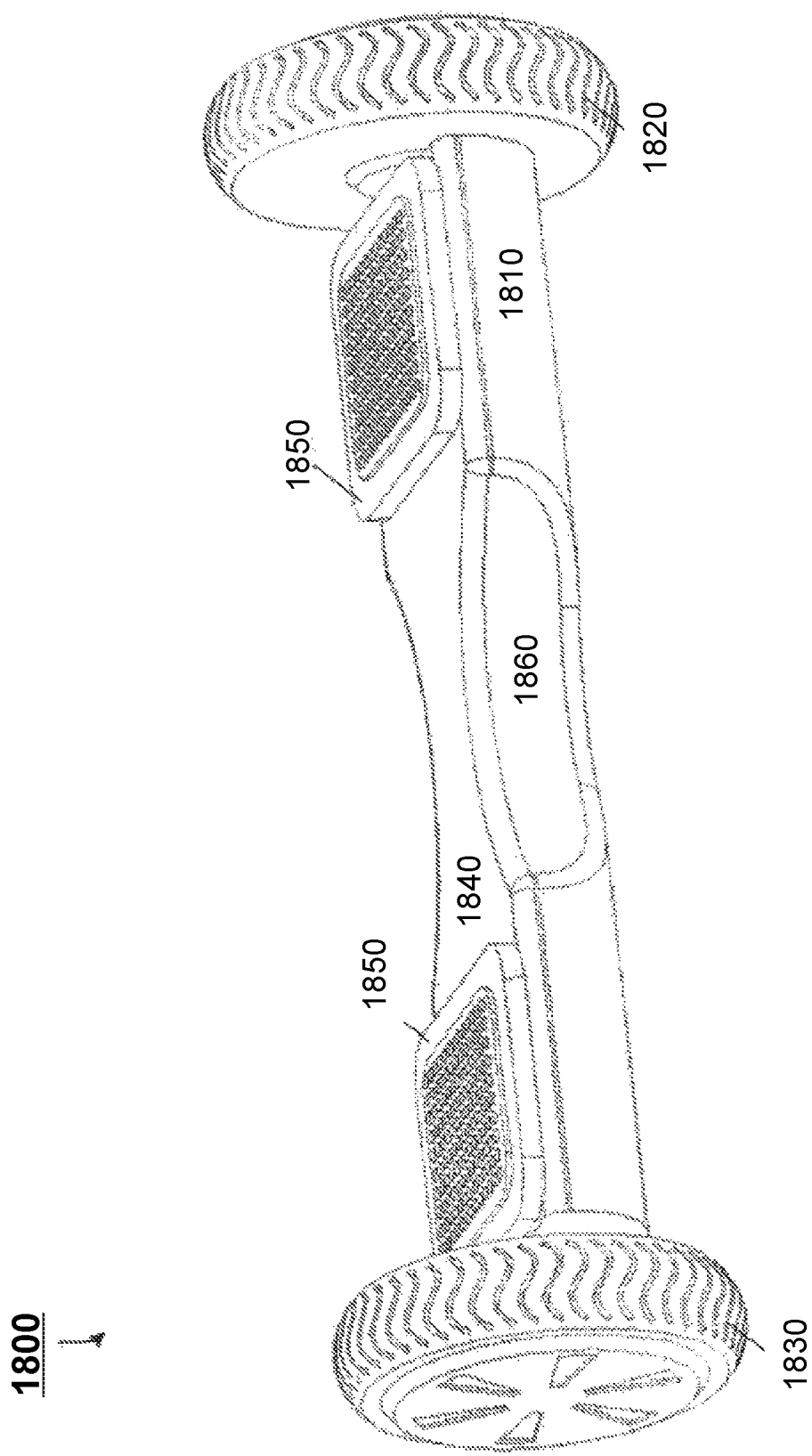
FIG. 18 is a schematic diagram of an exemplary personal transport vehicle according to an exemplary embodiment of the disclosure.
Figure 19:
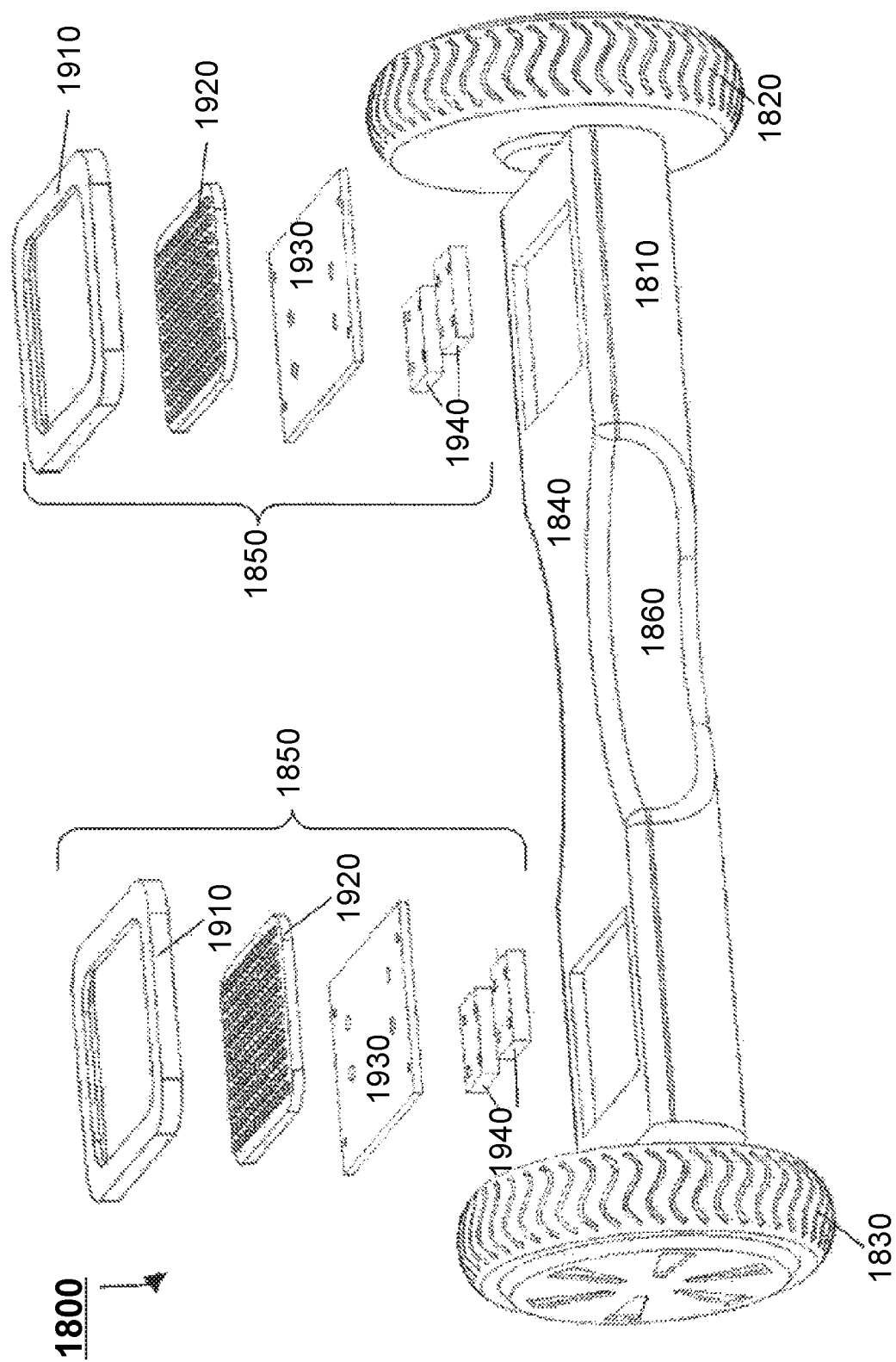
FIG. 19 is an exploded schematic diagram of the footpads of an exemplary personal transport vehicle according to an exemplary embodiment of the disclosure.
Figure 20:
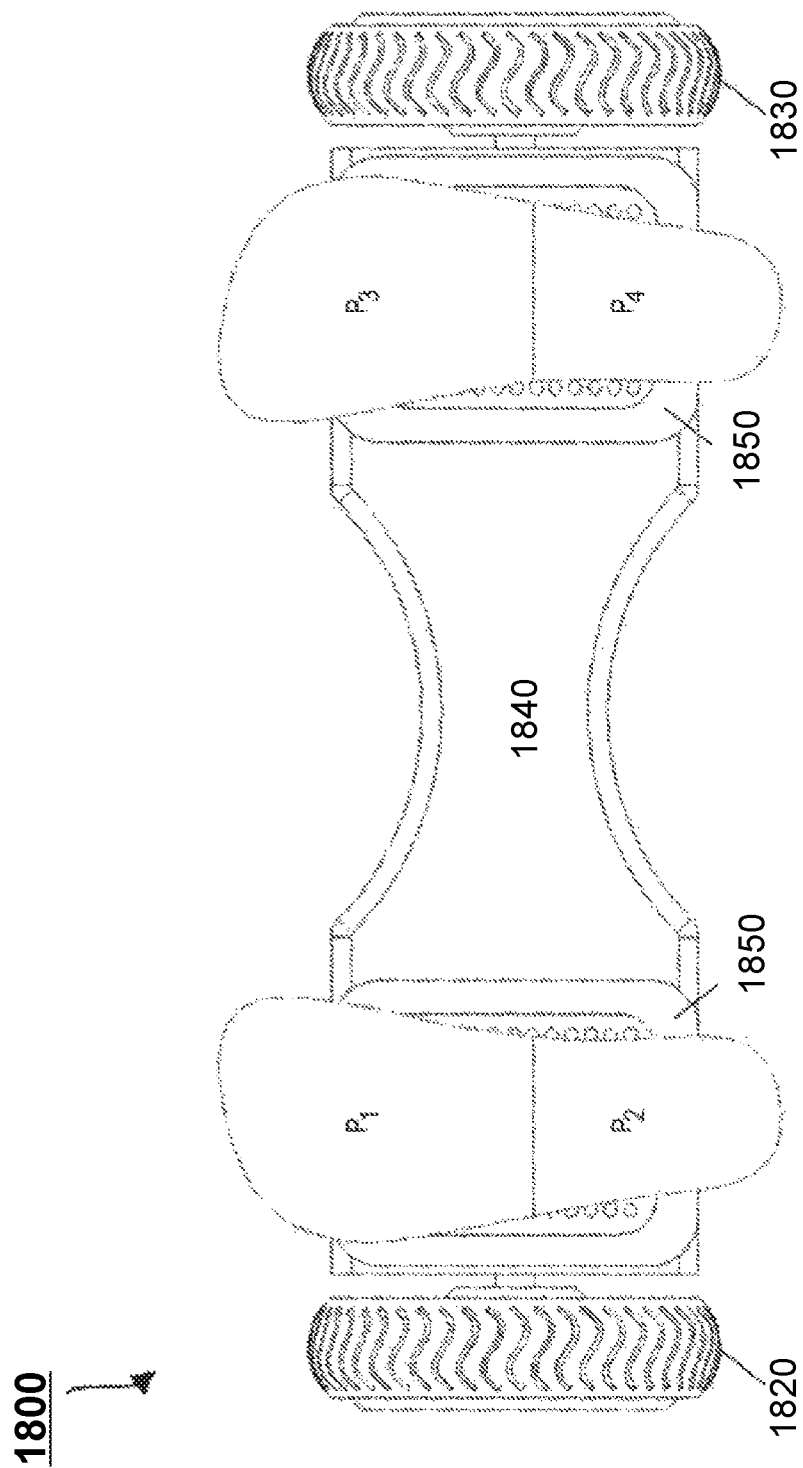
FIG. 20 is a schematic diagram of the interaction between a driver's feet and the pressure sensors of an exemplary personal transport vehicle according to an exemplary embodiment of the disclosure.

FIG. 18 is a diagrammatic illustration of an exemplary personal transport vehicle 1800, according to an exemplary embodiment of the disclosure. Vehicle 1800 may be, for example, an electric vehicle, a fuel cell vehicle, or a hybrid vehicle. Vehicle 1800 may be a personal transport vehicle intended for a single driver or may be configured to carry passengers. Vehicle 1800 may be configured for a variety of driver stances (e.g., standing, sitting, crouching), and it is contemplated that vehicle 1800 may include handlebars or other support devices.

In the exemplary embodiment shown in FIG. 1, vehicle 1800 may include body 1810, wheels 1820 and 113, and platform 114, on which one or more support pads, such as footpads 1850 may be positioned. Support pads are designed for supporting a user (e.g., a driver). Even though footpads 1850 are described here as examples, the support pads may not be limited to footpads. For example, a person may be sitting on vehicle 1800 via the support pads and operate the vehicle using hand operations.

Wheels 1820 and 1830 may be driven by one or more motors (not shown). Vehicle 1800 may also include a control circuit configured to generate control signals for the motors to drive the wheels.

Body 1810 and platform 1840 may be composed of, for example, steel, alloys, carbon fiber, or other materials able to bear a desired amount of weight. Body 1810 may be scaled to accommodate a desired riding stance for the driver, and may be shaped with one or more cutouts 1860, as shown, to facilitate a driver carrying vehicle 1800 or to decrease the weight of vehicle 1800. Similarly, platform 1840 may be configured in an hourglass shape, as shown in FIG. 1, or may be of any other shape. Platform 1840 may be configured to support a driver so that a driver may ride upon platform 1840 in a desired stance, e.g., with his feet facing in the same direction, different directions, in multiple positions. Platform 1840 may also be configured to accommodate passengers or cargo.

Wheels 1820 and 1830 may be rotationally disposal on body 1810. Wheels 1820 and 1830 may be inflated or solid, and may be sized to accommodate stability, speed, or other design considerations. As one of ordinary skill will recognize, vehicle 1800 may include additional or fewer wheels without departing from the scope of the invention. In addition, wheels 1820 and 1830 may be positioned in different ways with respect to body 1810.

Wheels 1820 and 1830 may be driven. In addition, vehicle 1800 may also include non-driven wheels, which may rotate freely. In some exemplary embodiments, each of wheel 1820 and wheel 1830 may be driven by a separate motor so that the rotation of wheel 1820 and the rotation of wheel 1830 may be independently controlled. Wheel 1820 and wheel 1830 may be driven by one or more A.C. motors or other types of motor. The motor(s) may be powered by one or more batteries or other power sources, which may be chargeable or replaceable.

In embodiments in which the rotation of wheel 1820 and wheel 1830 are separately controlled, the heading of vehicle 1800 may be adjusted by rotating one wheel more quickly than the other. For example, in the embodiment shown in FIG. 1, if left wheel 1820 rotates more quickly than right wheel 113, vehicle 1800 will turn to the right. This movement may be described in terms of vehicle 1800's yaw. Yaw describes the degree to which a vehicle turns about a vertical axis with respect to a known point (e.g., the degree vehicle 1800 deportions from a past heading). For example, if vehicle 1800 makes a right turn at a city intersection, it has yawed 90° to the right.

Varying the magnitude of the difference between the rotational speed of wheel 1820 and the rotational speed of wheel 1830 varies how quickly vehicle 1800 will turn. The "quickness" or rate of the turn made by vehicle 1800 may be described as the rate of change of yaw, which may be described as the angular velocity about a vertical axis of vehicle 1800. The measured rate of change of yaw ("W (yaw)") at a given time of vehicle 1800, may be measured according to known techniques, such as via one or more gyroscopes and/or gyroscope(s) and accelerometer(s). Where the difference between the rotational speed of wheel 1820 and the rotational speed of wheel 1830 is greater, W(yaw) will be greater, indicating vehicle 1800 is turning more quickly.

The motors driving wheels 1820 and 1830 may each be controlled by control signals from the control circuit. In exemplary embodiments, the control circuit may include one or more proportional-integral-derivative (PID) controllers. The control signals controlling the motor driving wheel 1820 may be different from the control signals controlling the motor driving wheel 113. The control signals controlling each of the motors driving wheels 112 and 1830 may be pulse-width modulated (PWM) currents.

Vehicle 1800 may include sensors that measure actual characteristics or posture of vehicle 1800. The sensors may be, for example, balance sensors to detect the tilt of platform 114, sensors detecting the speed of vehicle 1800, sensors detecting W(yaw), etc. Such sensors may include accelerometers, speedometers, odometers, gyroscopes, tilt sensors, temperature sensors, pressure sensors, magnetic sensors, and other sensors known in the art. Such sensors may be disposed in body 1810 or elsewhere in vehicle 1800. The control circuit may generate control signals based on data from the sensors and provide the control signals to the motors to vary the wheels' respective rotational speeds. The control circuit may vary the respective rotational speeds of wheels 1820 and 1830 in order to control and adjust characteristics of vehicle 1800 to achieve desired characteristics of vehicle 1800, based on e.g., targets set by the manufacturer, pre-selected driver preferences, real-time driver inputs, and/or input from the sensors of vehicle 1800. For example, if a balance sensor of vehicle 1800 indicates that platform 1840 has tilted too far as compared to a target tilt set by the manufacturer, the control circuit may generate control signals to vary the wheels' rotation and return the tilt of platform 1840 to acceptable levels.

In exemplary embodiments, vehicle 1800 may include a plurality of pressure sensors configured to detect pressure applied by the driver on platform 114. The data from pressure sensors 1940 may be used to steer vehicle 1800. Pressure sensors 1940 may be included in or under footpads 116, which may be positioned on platform 114. As shown in FIG. 2, an exploded diagrammatic illustration of the footpads of an exemplary vehicle, footpads 1850 may be composed of multiple portions. For example, each footpad 1850 may include a cover 1820, a soft pad 124, a hard pad 124, and one or more pressure sensors 1940.

By way of example, cover 1910 may be of plastic or metal, soft pad 124 may be of rubber or other cushioning material, and hard pad 124 may be of hard metal. It is contemplated that components of footpad 1850 may be omitted or added. Each footpad 1850 may further include one or more pressure sensors 1940. Pressure sensors 1940 may provide real-time data regarding the pressure applied by the driver on footpad 116. Each pressure sensor 1940 may be associated with a single point, but it is also contemplated that a single pressure sensor may sense the pressure applied at multiple points.

In an exemplary embodiment, pressure sensors 1940 may be positioned to sense pressure at the front of a left footpad 1850 ($P_1$), the rear of the left footpad 1850 ($P_2$), the front of a right footpad 1850 ($P_3$), and the rear of the right footpad ($P_4$). As shown in FIG. 3, a diagrammatic illustration of the interaction between a driver's feet and the pressure sensors of an exemplary vehicle, these positions may correspond to different portions of a driver's feet, for example, the front portion of the driver's left foot ($P_1$), the back portion of the driver's left foot ($P_2$), the front portion of the driver's right foot ($P_3$), and the back portion of the driver's right foot ($P_4$), in order to sense the pressure applied by different portions of the driver's feet. Alternatively or in addition, pressure sensors 1940 may be positioned to sense the pressure applied by other portions of the driver's feet, for example, the inner and outer portions of the driver's feet.

In exemplary embodiments, vehicle 1800 may be started and stopped according to whether a driver is applying pressure on platform 114. For example, if pressure sensors 1940 detect no pressure, the motor driving wheel 1820 and/or wheel 1830 may not start or, if running, may be stopped.

In addition, the data from pressure sensors 1940 may be used to steer vehicle 1800 by pressure control. In embodiments of the present disclosure, data from pressure sensors 1940 are compared to detect a driver-intended speed differential between the left and right wheels, rather than a weight distribution or the center of gravity of the driver as occurs in some existing devices. In other words, the driver may indicate, by applying different pressure on the pressure sensors, how much faster the left wheel should move than the right wheel, or vice versa, without necessarily trying to shift his/her weight or center of gravity across the vehicle, which may be difficult to do under certain circumstances (e.g., when the driver is carrying grocery bags in one hand).

Figure 21:
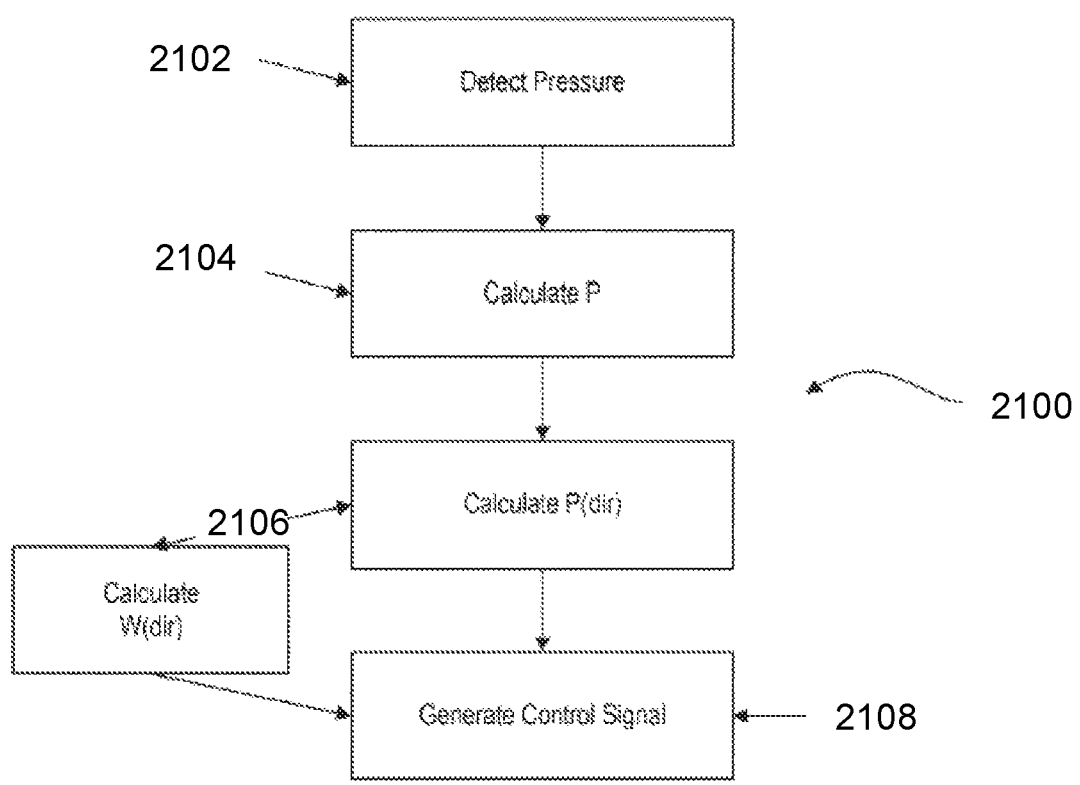
FIG. 21 is a flowchart illustrating an exemplary process for using pressure control to steer a personal transport vehicle according to an exemplary embodiment of the disclosure.

FIG. 21 is flowchart illustrating an exemplary process 2100 for using pressure control to steer vehicle 1800. In some embodiments, the process 2100 may be implemented on the human-machine interaction somatosensory vehicle 100.

First, in step 2102, the plurality of pressure sensors 1940 may measure the pressure applied by a user (also referred to as a driver, a rider, etc.). In some embodiments, the first force receiving portions 455 and the second force receiving portions 465 of the pedal devices 120 may measure the pressure applied by the user. For instance, the first force receiving portion 455 and the second force receiving portion 465 located at a front portion of the first position sensor 810 on a left pedal device 120 may measure the pressure at the front of a left pedal device ($P_1$). the first force receiving portion 455 and the second force receiving portion 465 located at a rear portion of the first position sensor 810 on a left pedal device may measure the pressure at the rear of the left pedal device ($P_2$). Similarly, the first force receiving portions 455 and the second force receiving portions 465 located at a front portion and a rear portion of a right pedal device may measure the pressure at the front and the rear of the right pedal device, respectively ($P_3$ and $P_4$, respectively). In step 2104, the pressure differential ("P") across pressure sensors 1940 may be calculated by the control circuit or other known methods according to the formula (1):

$$P=(P_1-P_2)-(P_3-P_4). \tag{1}$$

The difference between $P_1$ and $P_2$ may provide the pressure differential across the driver's left foot, and the difference between $P_3$ and $P_4$ may provide the pressure differential across the driver's right foot. Thus, P may describe the pressure differential across each of the driver's feet. In step 2106, P can be used to determine a calibrated target change in yaw over time (angular velocity about the vertical axis), P(dir). P(dir) may be calculated by the control circuit or other known methods based both on the real-time pressure differential and the linear velocity of vehicle 1800, according to the formula (2):

$$P(\text{dir})=P^* (1.0-V/K_1). \tag{2}$$

where $K_1$ is the V feedback coefficient, and V is the linear velocity of vehicle 1800, according to the following limitations in formula (3):

$$V = \begin{cases} K_1; & V > K_1 \\ 0; & V < 0 \\ V; & 0 \le V \le K_1 \end{cases} \quad (3)$$

where V may be measured through known methods, such as via accelerometer data.

The control circuit may also calculate W(dir). In step 2106, W(dir), a calibrated measured change in yaw over time, may be calculated according to the formula (4):

$$W(\text{dir}) = W(\text{yaw})*(1.0 + V/K_2), \quad (4)$$

where W(yaw) is the measured yaw of vehicle 1800, as previously discussed, and $K_2$ is the yaw rate of change (W(yaw)) feedback coefficient.

Using P(dir) and W(dir), in step 2108, the control circuit of vehicle 1800 may generate control signals. The control signals may drive wheels 112 and 1830 independently of one another, and may be based on P, the pressure differential applied by the driver. If, for example, the driver applies more pressure in the front-left sensor ($P_1$) than the rear-left sensor ($P_2$), the driver may be instructing vehicle 1800 to make a right, forward turn. At the same time, if the driver applies more pressure in the front-right sensor ($P_3$) than the rear-right sensor ($P_4$), the differential between $P_3$ and $P_4$ may offset the intended turn. The magnitude of P, which reflects the difference between the left and right differentials, may dictate the speed or rate at which vehicle 1800 should make the turn (i.e., the change in yaw over time W). For example, a greater P may cause vehicle 1800 to turn more quickly than a smaller P. Such pressure control may allow the driver to steer intuitively without having to physically shift position (e.g., leaning the body forwards and backwards), which may improve driver balance and safety.

According to these equations, the calibrated target change in yaw over time (P(dir)) will be smaller and the calibrated measured change in yaw over time (W(dir)) will be greater when the linear velocity of vehicle 1800 is greater. Thus, when vehicle 1800 is moving at high speed, the control circuit may cause the yaw to adjust more slowly, improving driver control and the stability of vehicle 1800. In contrast, when vehicle 1800 is moving at low speed, the control circuit may cause the yaw to adjust more quickly.

In exemplary embodiments, the control signals may be based on additional inputs. For example, the control circuit may generate a first PWM current ("PWM1"), which may be used to adjust the tilt of platform 1840 based on data from a balance sensor of vehicle 1800, such as an accelerometer, a gyroscope, a tilt sensor, or other sensors known in the art. The control circuit may also generate a second PWM current ("PWM2"), which may be used adjust the angular velocity of platform 1840 about an axis between wheels 1820 and 113, based on data from one or more sensors of vehicle 1800, such as an accelerometer, a gyroscope, a tilt sensor, or other sensors known in the art. The control circuit may also generate a third PWM current ("PWM3"), based on P(dir) and W(dir), as described above. The control signals may be based on all of PWM1, PWM2, and PWM3.

For example, the motor driving wheel 1820 may be controlled by weighted control signals accounting for PWM1, PWM2, and PWM3, according to the formula (5):

$$PWM(L) = f1(v)*PWM1 + f2(v)*PWM2 + f3(v)*PMW3. \quad (5)$$

Similarly, the motor driving wheel 1830 may be controlled by weighted control signals accounting for PWM1, PWM2, and PWM3, according to the formula (6):

$$PWM(R) = f1(v)*PWM1 + f2(v)*PWM2 f3(v)*PMW3. \quad (6)$$

In each case, f1(v), f2(v), and f3(v) may be set based on device testing according to the formula (7):

$$\begin{cases} 0 < f1(v) < 1; \\ 0 < f2(v) < 1; \\ 0 < f3(v) < 1; \\ f1(v) + f2(v) + f3(v) = 1. \end{cases} \quad (7)$$

It is contemplated that f1(v), f2(v), and f3(v) may be constants, or may be calculated as a function of V or other measured characteristics sensed by sensors of vehicle 1800.

After the control signals have been provided to the motors driving wheels 1820 and 113, the entire process may be repeated in order to dynamically control the steering of vehicle 1800.

Figure 22:
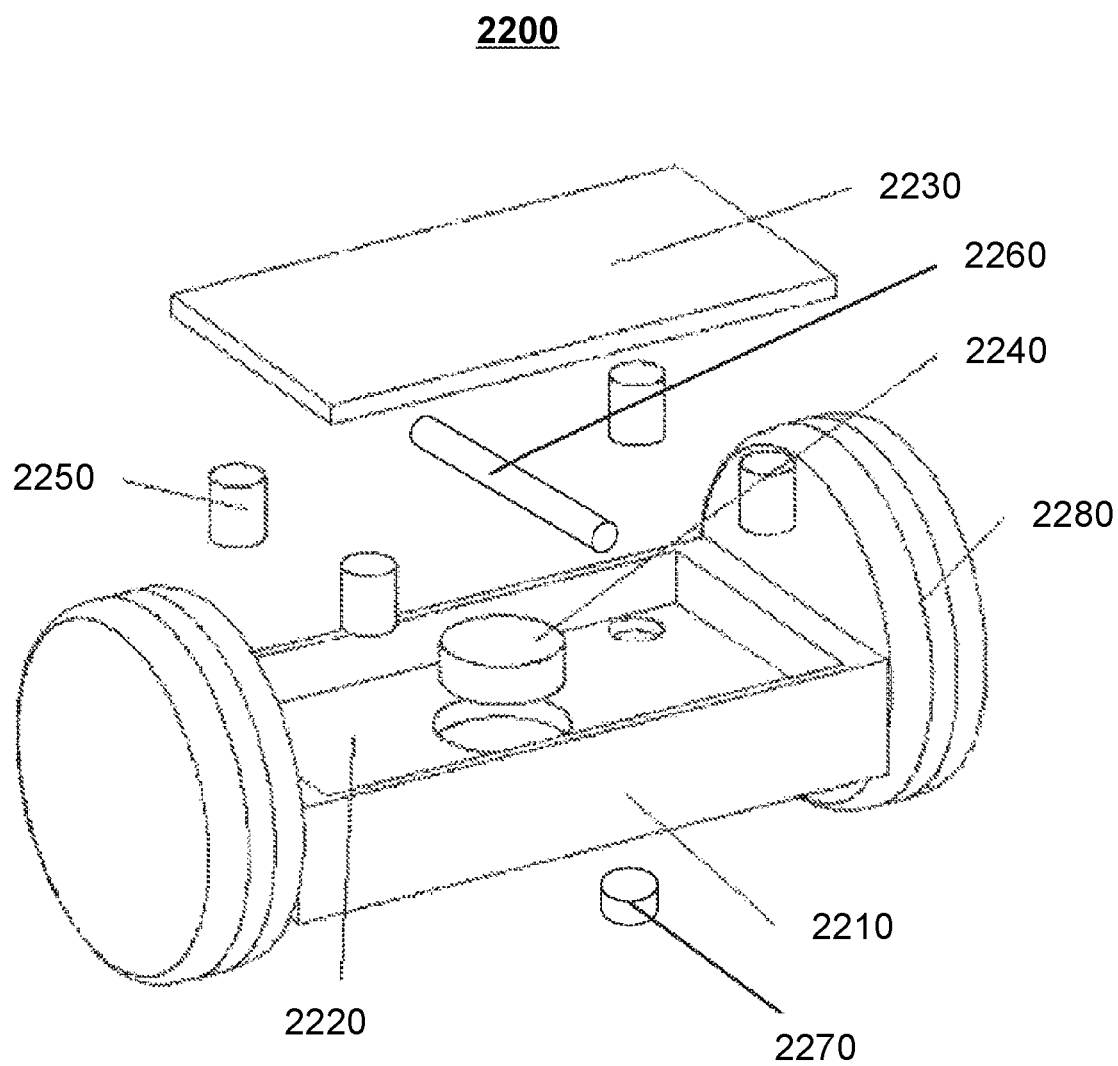
FIG. 22 is an exploded diagram of an all-attitude human-machine interaction vehicle according to an exemplary embodiment of the disclosure.

Referring to FIG. 22, an all-attitude human-machine interaction vehicle 2200, according an exemplary embodiment of the present disclosure, includes a vehicle body 2210 and two wheels 2280 coupled with the vehicle body 2210.

Typically, planes of the two wheels 2280 may be parallel with each other, and axles of the two wheels 2280 may be aligned in substantially a same imaginary straight line. The two wheels 2280 may be assembled to opposite sides of the vehicle body 2210 through the respective axles. For example, the two wheels 2280 may be assembled to opposite ends of the vehicle body 2210, respectively, or assembled at two sides under the vehicle body 2210. In this embodiment, the two wheels 2280 may be rotatably coupled with opposite ends of the vehicle body 2210. The two wheels 2280 can rotate about an axis of the vehicle body 2210, which may substantially coincide with the above imaginary straight line, thereby enabling movement of the all-attitude human-machine interaction vehicle 2200.

Also referring to FIGS. 23A, 23B, 23C, 24A, 24B, 24C, the vehicle body 2210 may include a support frame 2220, a pedal 2230 disposed on the support frame 2220, a first position sensor 2240, and a controller 2270. The support frame 2220 may define a single pedal area which is away from the ground. The pedal 2230 may be arranged in the pedal area. The first position sensor 2240 may detect attitude information of a user standing on the pedal 2230, and send the attitude information to the controller 2270. The controller 2270 may thus control the wheels 2280 to rotate according to the attitude information, so that the user can manipulate the all-attitude human-machine interaction vehicle 2200 to move forward (shown in FIG. 23B) and backward (shown in FIG. 23C), or take turns (shown in FIG. 24B or FIG. 24C), like turn right or turn left. The attitude information may include posture information of the user standing on the pedal 2230. In this embodiment, the support frame 2220 may be formed into an unitary structure and be rotatably coupled with the two wheels 2280. By unitary structure, it may mean that the constituent portions of the support frame 2220 cannot be moved with respect to each other such that the support frame is substantially an integral piece, which is different from the prior art that in a conventional human-machine interaction vehicle a left internal cover can be rotated with respect to the right internal cover. The support frame 2220 can be formed into an unitary structure by molding, welding, or riveting. The support frame 2220 can be of any shape, such as a rigid plate-type structure or a rigid shaft. In this embodiment, the support frame 2220 can be a rigid plate-type structure.

The pedal 2230 may be independently mounted on the support frame 2220. By "Independently mounted", it may mean that the pedal 2230 is not fixedly disposed on the support frame, but to a certain extent loosely assembled to the support frame through intermediate connections such that the pedal 2230 can move with respect to the support frame 2220. For example, the pedal 2230 can be rotatably connected to the support frame 2220 through a shaft 2260, a hinge, or a universal joint. When a shaft 2260 or a hinge is applied, the pedal 2230 can only rotate about the shaft 2260 or a hinge axis with respect to the support frame 2220, otherwise when a universal joint is applied, the pedal 2230 can pivot around the universal joint in arbitrary directions. In both cases, a control signal can be generated from the rotation or movement of the pedal 2230 and thus be sent to the controller 2270 to manipulate the motion of the all-attitude human-machine interaction vehicle 2200. However, it should be noted that the connection between the pedal 2230 and the support frame 2220 is by no means limited to the above connection methods, any connections by which the pedal 2230 can be moved with respect to the support frame 2220 can be applied. In this embodiment, the pedal 2230 may be rotatably connected to the support frame 2220 about the shaft 2260, which is substantially a perpendicular bisector of the above defined axis of the support frame 2220. Thus, when the user stands on the pedal 2230, the pedal 2230 can be rotated with respect to the support frame 2220 to form a left- or right-tilt angle. The pedal 2230 can be of any shape. In this embodiment, the pedal 2230 is an integral plate-type structure. Referring to FIGS. 23B, 23C, 24B, and 24C, the human-machine interaction vehicle moves forward or backward when there is a first difference in height on the pedal 2230 along the shaft 2260, and the human-machine interaction vehicle takes turns when there is a second difference in height on the pedal 2230 along a direction perpendicular to the shaft 2260.

The first position sensor 2240 may be configured to detect attitude information of the user standing on the pedal 2230. It should be appreciated that the first position sensor 2240 can control multiple motions of the wheels 2280, not merely rotation. For example, the first position sensor 2240 can detect a left-tilt angle, a right-tilt angle, or a vertical position difference of opposite ends of the pedal 2230 (the opposite ends refer to the ends pointing to the respective wheels 2280, and the vertical position difference may be calculated by taking the plane of the support frame 2220 as a reference horizontal plane). For example, if the left-tilt angle, the right-tilt angle, or the vertical position difference is close to zero, the all-attitude human-machine interaction vehicle 2200 would move forward or backward in a substantially straight line. If the left-title angel or the vertical position difference is relatively large, the all-attitude human-machine interaction vehicle 2200 may turn left. Specifically, the magnitude of the left-tilt angle, the right-tilt angle, or the vertical position difference to trigger the turning motion can depend on the user's preference. For example, some user may prefer the turning-trigger mechanism to be more sensitive, then the triggering magnitude of the tilt angles or the position difference can be set to be smaller. The human-machine interaction vehicle moves forward or backward when there is a first tilt angle between the pedal 2230 and an imaginary axis of the wheels 2280, and the human-machine interaction vehicle takes turns when there is a second tilt angle between the pedal 2230 and the shaft 2260.

The first position sensor 2240 can be any type of position sensors, for example, a gyroscope, a photoelectric sensor, or a pressure sensor. The mounting position and number of the first position sensor 2240 can be arbitrary according to actual design requirements. For example, there may be one or more first position sensors 2240. In this embodiment, the first position sensor 2240 can be a pressure sensor, which can detect the attitude information of the user standing on the pedal 2230 by detecting pressures exerted on different portions of the first position sensor 2240. The first position sensor 2240 can be arranged between the pedal 2230 and the support frame 2220. For example, the first position sensor 2240 can be integrated into the shaft 2260 or a universal joint, against which the pedal 2230 can sway about such that two opposite ends of the pedal 2230 can approach or leave from the support frame 2220. Typically, the first position sensor 2240 can be a flexible structure, which can detect the attitude information of the user standing on the pedal 2230 by detecting deformation amounts at different orientations of the first position sensor 2240. Accordingly, the pedal 2230 can be pivoted to the pedal area of the support frame 2220 so that the first position sensor 2240 can easily detect the deformation amounts at different orientations on the pedal 2230. Specifically, the pedal area may be a receiving groove which is recessed toward an inside of the support frame 2220. A protrusion (not shown) may be provided at each side of the pedal 2230, facing towards the respective wheels 2280. The protrusions may be pivoted to the vehicle body 2210, so that the pedal 2230 can be rotatably connected to the support frame 2220. Alternatively, the pedal area can also be a flat plane instead of the receiving groove, in which case the support frame 2220 may be sheathed in the pedal 2230.

The first position sensor 2240 can also employ other approaches to detect the attitude information of the user standing on the pedal 2230. For example, two flexible supports 2250 can be arranged between the pedal 2230 and the support frame 2220. The first position sensor 2240 can detect the attitude information of the user standing on the pedal 2230 by detecting the deformation of the flexible supports 2250. Alternatively, four flexible supports 2250 can be arranged between the pedal 2230 and the support frame 2220. The first position sensor 2240 may be arranged among the four flexible supports 2250, and detect the deformation amounts of the flexible supports 2250 with a balance position of each flexible support taken as a reference position for deformation measurements. By "balance position", it may mean the exact configuration or state of each flexible support when the user is standing on the pedal and the gravitational pull of earth on the user is balanced with the vertical component of the support force or normal force of the pedal (in the vertical direction the user is in a state of equilibrium since there is no movement in the vertical direction). Thus, the flexible support would be deformed to a certain degree in response to the pressure exerted by the user to the pedal, and the exact deformation condition of each flexible support will be referenced as the initial condition based on which the deformation amounts will be calculated to generate the signals for controlling the motions of the human-machine interaction vehicle. In another example, the user can lean forward or backward when standing on the pedal 2230 and the pedal 2230 can be such rotatably connected to the support frame 2220 that the pedal 2230 can sway with respect to the support frame 2220 about the axis of the support frame 2220, hence the pedal 2230 would lean forward or backward to form a forward tilt or backward tilt angle with respect to the support frame 2220. The first position sensor 2240 can detect the rotation information of the pedal 2230 about the axis of the support frame 2220. And the vehicle body 2210 may further include a second position sensor (not shown) configured to detect tilt information of the support frame 2220 with respect to the ground. The controller 2270 may thus drive the all-attitude human-machine interaction vehicle 2200 to move forward or backward based on the tilt information detected by the second position sensor, and drive the all-attitude human-machine interaction vehicle 2200 to take turns based on the rotation information detected by the first position sensor 2240. Alternatively, the first position sensor 2240 may be a tracking ball (similar to a mouse tracking ball) placed into the space between the pedal 2230 and the support frame 2220. The tracking ball can roll in any directions. The attitude information of the user standing on the pedal 2230 can thus be detected by detecting a position of the tracking ball with respect to the pedal 2230.

Figure 23A:
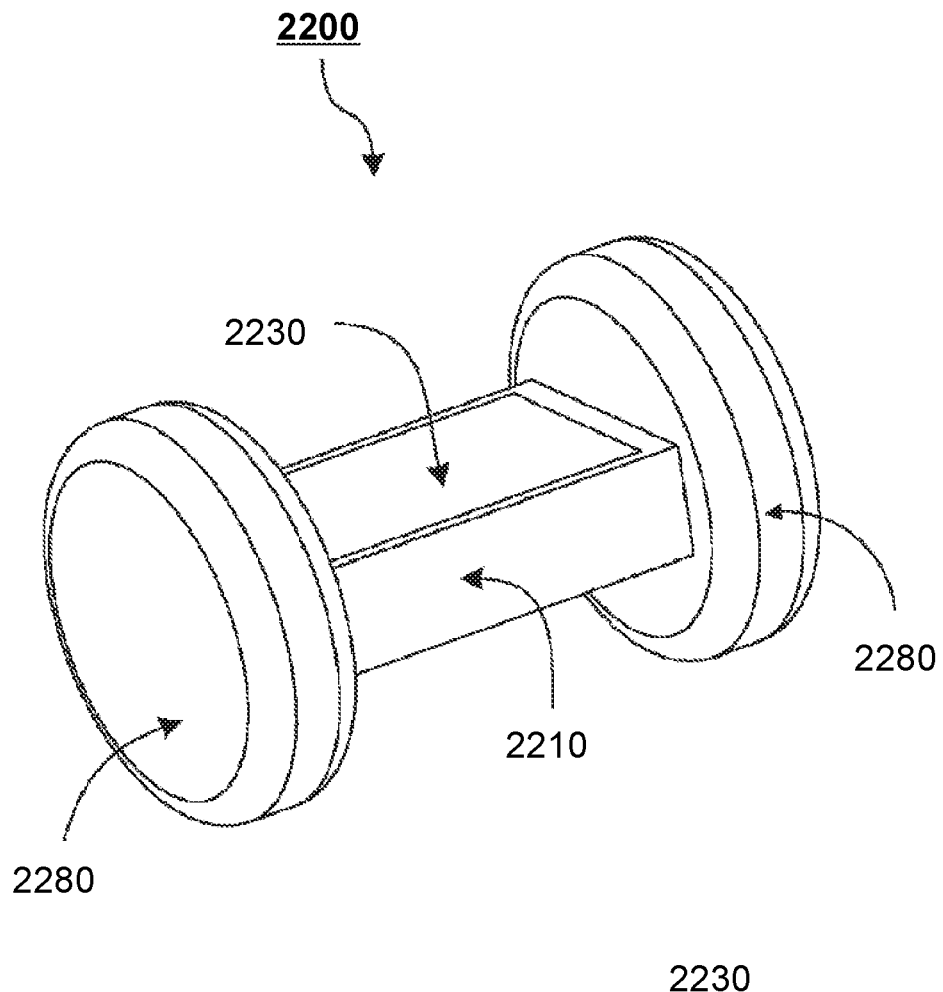
FIG. 23A is a schematic diagram of a moving scenario of the all-attitude human-machine interaction vehicle according to the exemplary embodiment shown in FIG. 22, in which the all-attitude human-machine interaction vehicle moves straight forward or backward at a constant speed, while the vehicle body and the pedal stays horizontal.
Figure 23B:
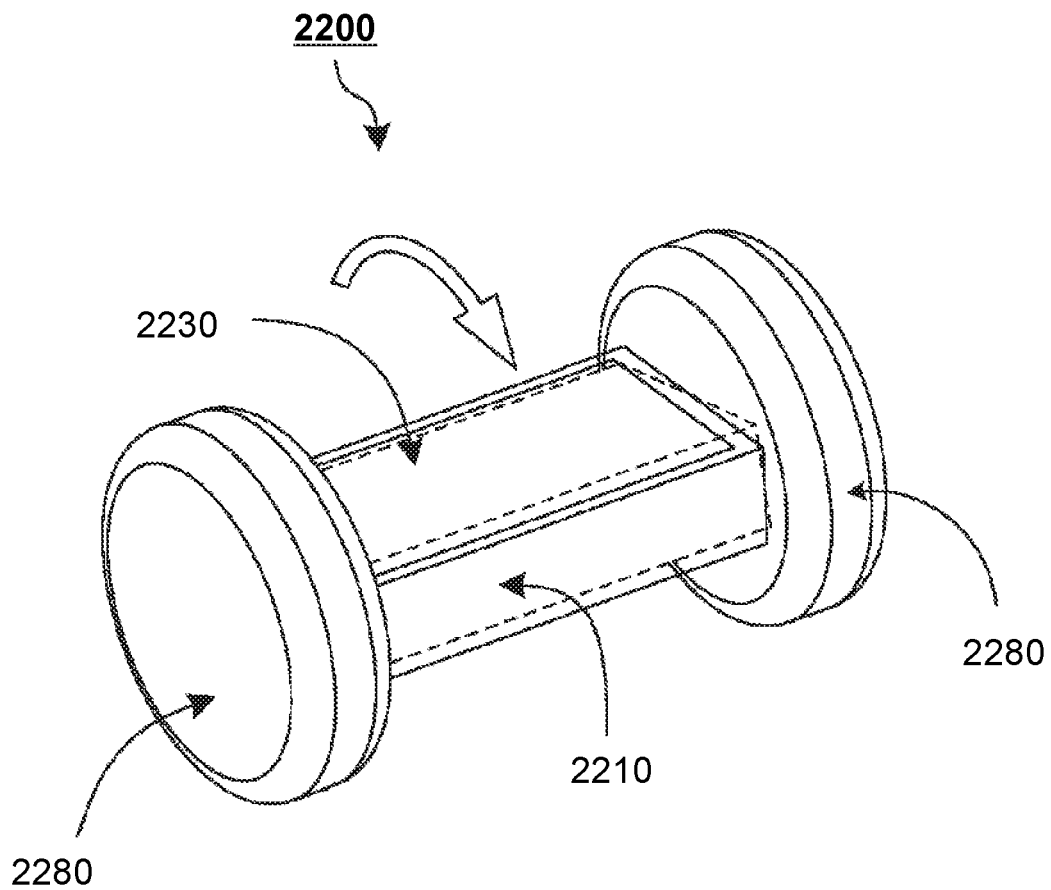
FIG. 23B is a schematic diagram of another moving scenario of the all-attitude human-machine interaction vehicle according to the exemplary embodiment shown in FIG. 22, in which the all-attitude human-machine interaction vehicle accelerates forward, while the vehicle body tilts forward accordingly.
Figure 23C:
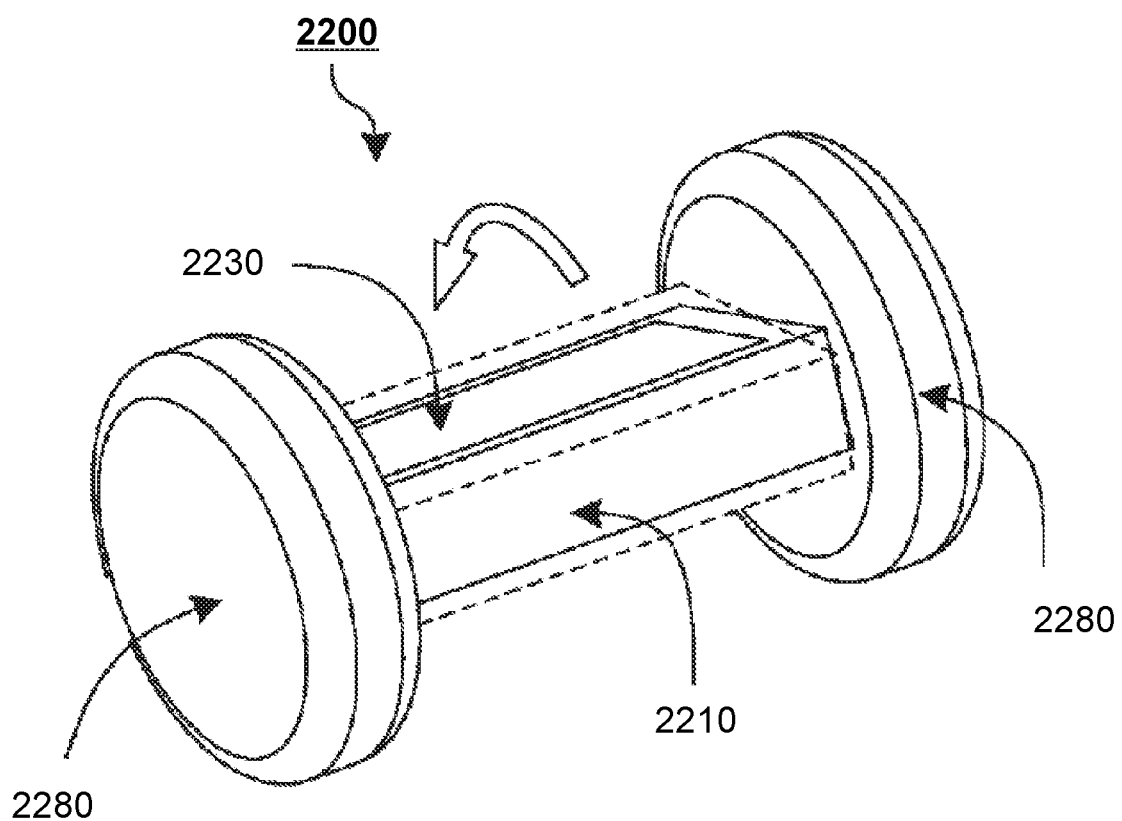
FIG. 23C is a schematic diagram of yet another moving scenario of the all-attitude human-machine interaction vehicle according to the exemplary embodiment shown in FIG. 22, in which the all-attitude human-machine interaction vehicle accelerates backward, while the vehicle body tilts backward accordingly.

Referring now to FIGS. 23A- 23C, in which different moving scenarios of the all-attitude human-machine interaction vehicle according to the exemplary embodiment as shown in FIG. 22 are illustrated. In the scenario as shown FIG. 2A, the vehicle 2200 may drive forward or backward at a constant speed, which may indicate that no acceleration occurs, so both the vehicle body 2210 and the pedal 2230 may stay horizontal (suppose it is driving on a horizontal ground). By remaining the vehicle body 2210 horizontal, the vehicle 2200 can be informed that the driver wishes the vehicle to move on at a constant speed, so that the vehicle could produce the traction that is balanced by the friction with the ground. Likewise, by staying the pedal 2230 horizontal, the vehicle 2200 can be informed to remain its moving direction without taking turns, i.e., to move in a straight line, so that the two wheels 2280, which are able to move independently of each other, may spin at exactly the same speed, thus enabling the vehicle to move on always towards the same direction and so maintains on a straight line.

The vehicle 2200 can move forward or backward, for example, the vehicle 2200 as shown in FIG. 23 is moving forward, while the vehicle body 2210 leans forward to a certain extent. On one hand, by leaning the vehicle body 2210 forward (for example, the driver can press his forefeet downward thus forcing the vehicle body to rotate around an axis of the two wheels 2280 and as a result the vehicle body 2210 will move from the position denoted by the dashed-lines to the position shown by solid lines, thus it creates a first difference in height on the pedal 2230 along the shaft 2260 from the solid lines to the dashed-lines), the vehicle 2200 can be signaled to increase its speed and thus produce an acceleration. On the other hand, as with the scenario illustrated in FIG. 2A, by keeping the pedal 2230 parallel with the vehicle body 2210, i.e., the pedal 2230 will not rotate about its width ways symmetric axis (perpendicular to the axis of the wheels), such that the vehicle 2200 can be informed to maintain the direction of movement, i.e., it will not take turns, and this can be achieved by keeping the speeds of the two independent wheels consistent, that is, the two wheels will drive at the same speed, and will accelerate or decelerate synchronously. Likewise, referring now to FIG. 23C, when the vehicle 2200 drives backwards, the vehicle body 2210 can lean backwards (move from the previous position denoted by the dashed-lines to the current position shown in solid lines, thus it creates another first difference in height on the pedal 2230 along the shaft 2260 from the solid lines to the dashed-lines) to signal the vehicle 2200 to increase its backward speed without taking turns. It is noteworthy that when the vehicle 2200 is driving forward, when the driver forces the vehicle body 2210 to tilt backwards, then the vehicle can be signaled to produce a deceleration, that is, the vehicle may reduce its forward speed until it stops.

Figure 24A:
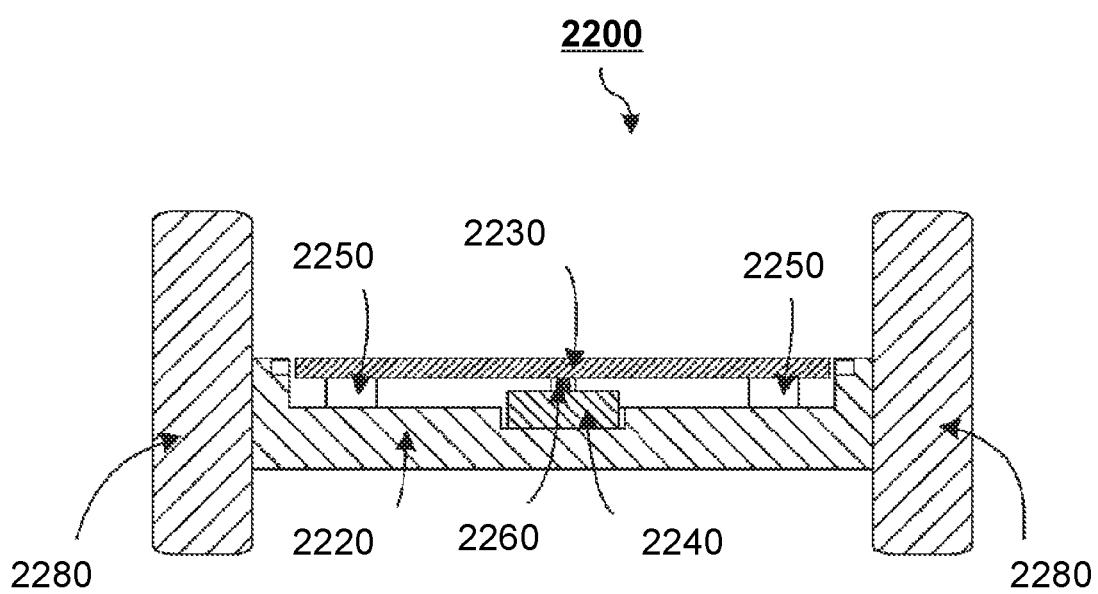
FIG. 24A is a schematic diagram of a moving scenario of the all-attitude human-machine interaction vehicle according to the exemplary embodiment shown in FIG. 22, in which the all-attitude human-machine interaction vehicle moves forward or backward in a straight line without turning.
Figure 24B:
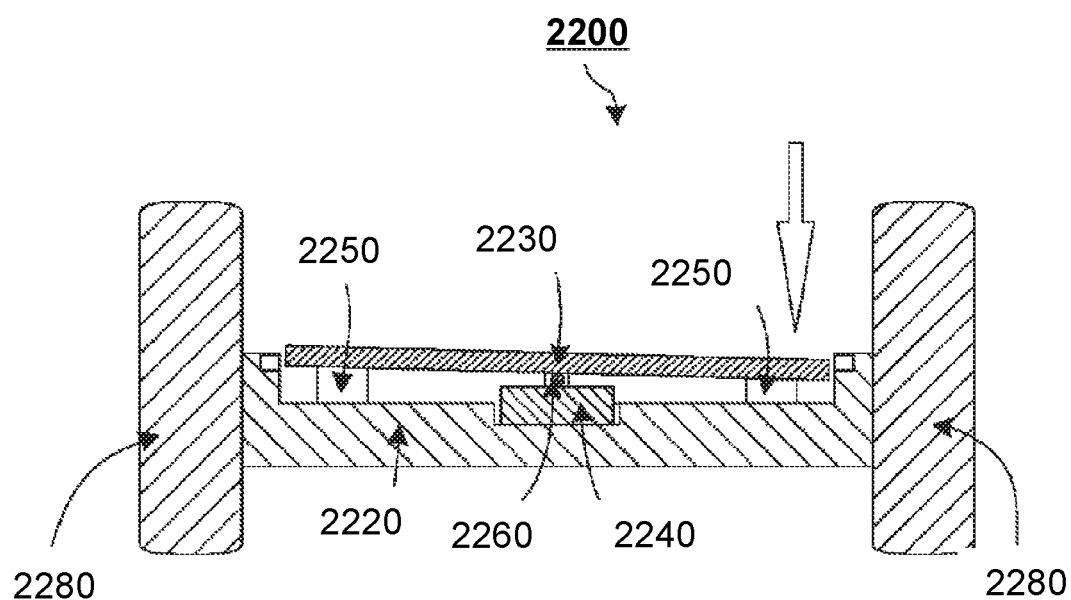
FIG. 24B is a schematic diagram of another moving scenario of the all-attitude human-machine interaction vehicle according to the exemplary embodiment shown in FIG. 22, in which the all-attitude human-machine interaction vehicle turns right when the vehicle drives towards the reader or turns left when it is driving away.
Figure 24C:
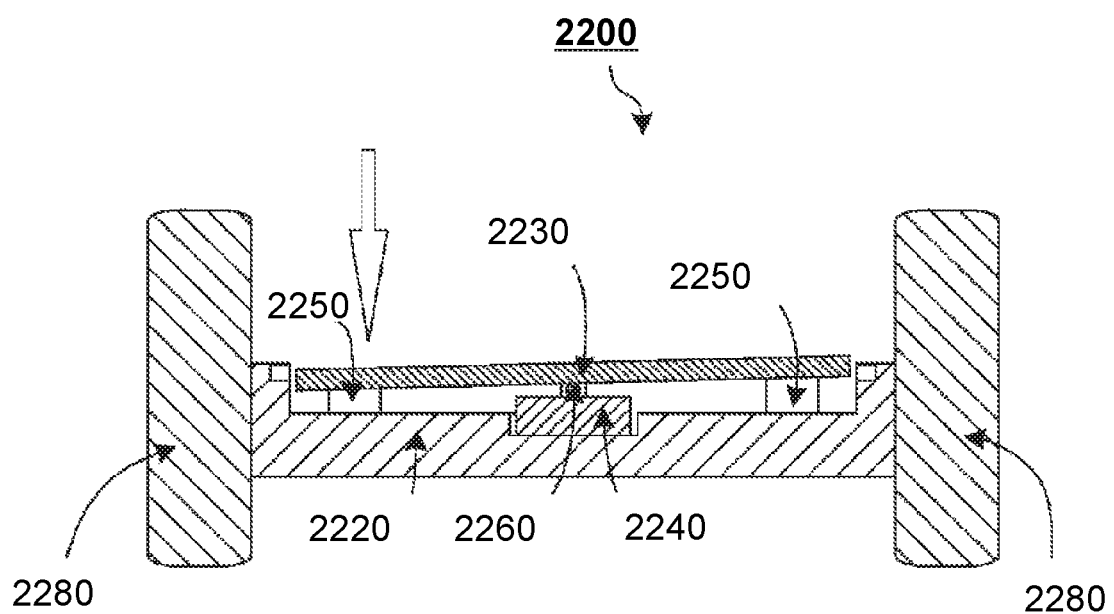
FIG. 24C is a schematic diagram of yet another moving scenario of the all-attitude human-machine interaction vehicle according to the exemplary embodiment shown in FIG. 22, in which the all-attitude human-machine interaction vehicle turns left when the vehicle drives towards the reader or turns right when it drives away.

FIGS. 24A-24C illustrate different moving scenarios of the all-attitude human-machine interaction vehicle according to the exemplary embodiment shown in FIG. 22. In the scenario shown in FIG. 24A, the vehicle 2200 may drive forwards or backwards (it actually has the same state of motion with the scenario as shown in FIG. 2A). Now suppose the vehicle 2200 drives forwards and the forward direction is one towards the reader, i.e., the vehicle 2200 drives towards the reader, then as with the scenario shown in FIG. 2A, the vehicle 2200 may move forwards on a straight line without taking turns. In the scenario shown in FIG. 24B, however, the driver may push his left foot against the corresponding flexible supports 2250 (there are two flexible supports 2250 on the left side of the driver) a little harder than the right foot, thus forcing the pedal 2230 to rotate about its width ways symmetrical axis, causing the flexible supports 2250 to experience different pressure and thus result in different degrees of deformation. And the vehicle 2200 can then be signaled to turn left, and this is achieved by driving the two independent wheels at different speeds; for example, either the left wheel may lower its speed or the right wheel may increase its speed, thus enabling the right wheel to outrun the left wheel. Likewise, referring to FIG. 24C, by pushing the right end of the pedal 2230 against the corresponding supports 2250 a little harder than the left end and thus deforming the supports 2250 at the right side to a larger degree than at the left side, the vehicle can be signaled to turn right. Note, throughout the scenarios shown in FIGS. 24A-24C, the first position sensor 2240 embedded inside the shaft 2260 can be used to detect the amount of deformation of these flexible supports 2250, and base on the acquired deformation information to generate and transfer a driving signal to the controller 2270 to move the vehicle 2200 in the manner indicated by the driving signal. In FIGS. 24B and 24C, the human-machine interaction vehicle 2200 takes turns there is a second difference in height on the pedal 2230 along a direction perpendicular to the shaft 2260.

In some embodiments, when the support frame 2220 is a rigid shaft 2260, opposite ends of the rigid shaft can be rotatably connected to the two wheels 2280. In this case, the rigid shaft 2260 can be sheathed in the pedal 2230. The first position sensor 2240 can be arranged between the pedal 2230 and the support frame 2220, and detect the attitude information of the user standing on the pedal 2230 by detecting a rotation angle of the pedal 2230 with respect to the rigid shaft 2260.

In an exemplary embodiment, the vehicle body 2210 of the all-attitude human-machine interaction vehicle 2200 may include an inductive switch (not shown) disposed in the pedal area. The inductive switch can detect whether the pedal 2230 is pressed or not, thereby controlling the wheels 2280 to rotate or stop. Specifically, the all-attitude human-machine interaction vehicle 2200 may only be started when the inductive switch is evenly pressed by the pedal 2230. This can prevent the user from being hurt because the wheels 2280 of a prior all-attitude human-machine interaction vehicle 2200 may rotate simultaneously when the user is standing on the pedal 2230. Furthermore, the inductive switch may include a pressure sensor and a photoelectric sensor, both can detect whether the pedal 2230 is pressed or not.

The vehicle body 2210 may further include a power source (not shown) and an actuation device (not shown). The power source may supply electrical energy to the actuation device, the first position sensor 2240, and the controller 2270. The controller 2270 can control the power source, the actuation device, and the first position sensor 2240, and send an actuation signal to the actuation device based on the tilt information detected by the first position sensor 2240 and the second position sensor, thereby driving the wheels 2280 to rotate. Typically, the vehicle body 2210 may include two actuation devices respectively assembled in the two wheels 2280 to control the corresponding wheels 2280.

Figure 25A:
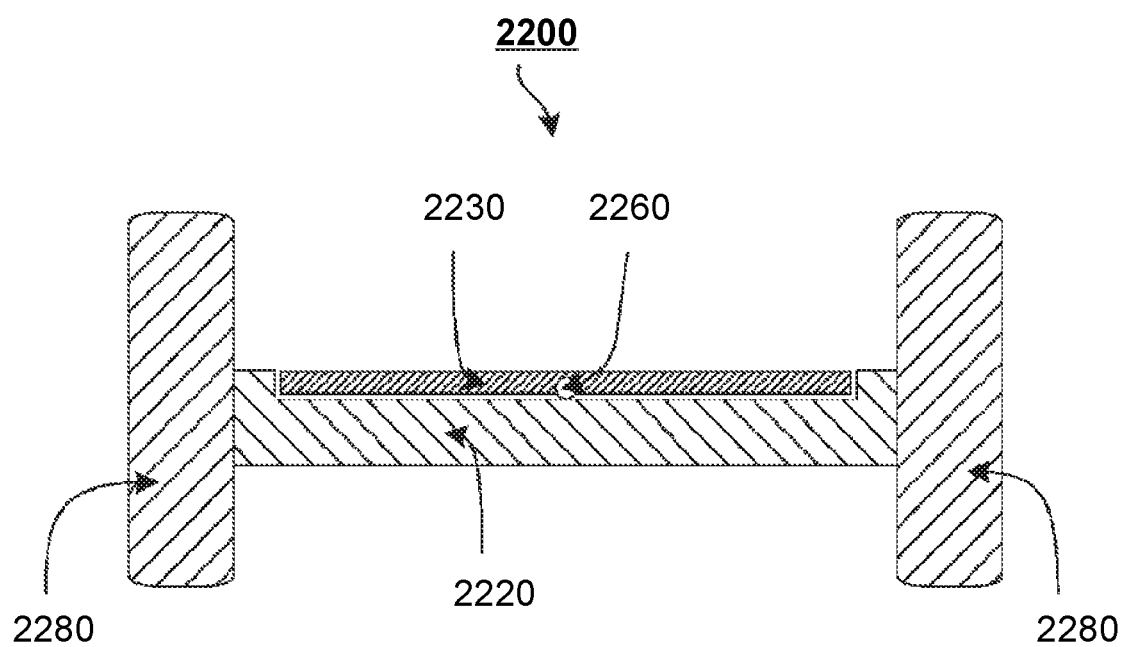
FIGS. 25A-25B are schematic diagrams of different configurations of the all-attitude human-machine interaction vehicle according to the exemplary embodiment shown in FIG. 22, depending on the shape of the pedal.

FIG. 25A shows another configuration of the all-attitude human-machine interaction vehicle according to the exemplary embodiment shown in FIG. 22. As shown in FIG. 25A, the pedal 2230 may have a flat upper surface and there is a tiny gap reserved between the pedal 2230 and the vehicle body 2210, which more closely reveals the actual configuration of the vehicle, since the pedal 2230 may conduct only tiny motions with respect to the vehicle body 2210 (i.e., rotate about the shaft 2260), and these tiny motions would suffice to generate the turning signals, based on which the vehicle 2200 can take turns. In addition, the majority of the shaft 2260 can be embedded into the pedal 2230. By the small-gap and embedded-shaft configuration, the stability of the vehicle can be further enhanced. The first position sensor 2240 may be mounted in any place of the pedal 2230 or support frame 2220.

Figure 25B:
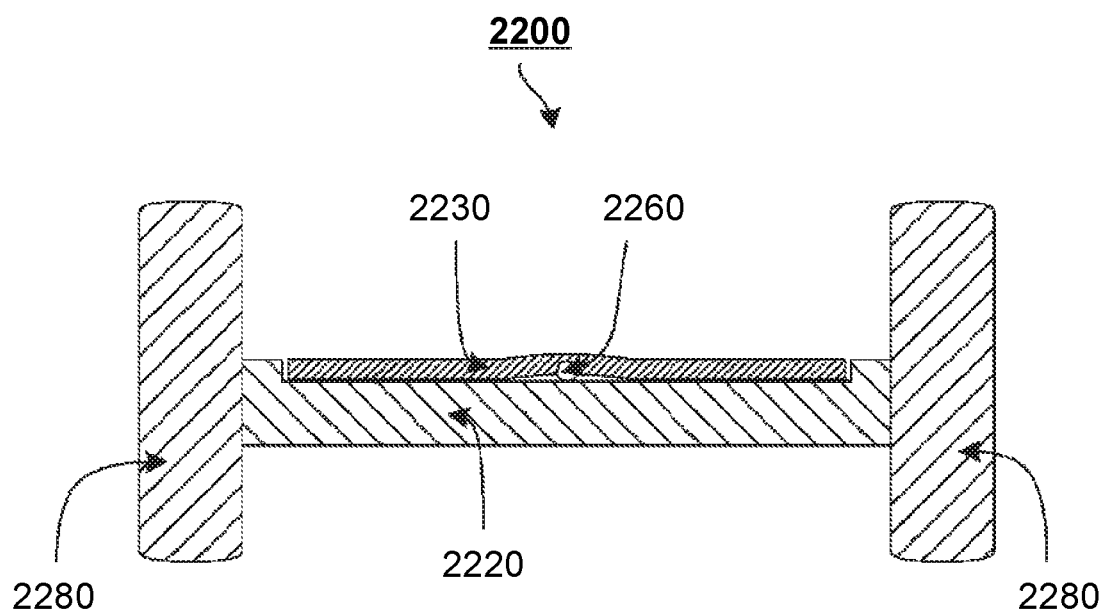

FIG. 25B shows another configuration of the all-attitude human-machine interaction vehicle according to the exemplary embodiment as shown in FIG. 22. This configuration differs from FIG. 25A in that the central portion of the pedal 2230 is ridged above. Also, the majority of the shaft 2260 can be embedded into the pedal 2230.

Note, in the configurations as shown throughout FIGS. 25A-25B, the first position sensor 2240 can be integrated with the shaft 2260 and can thus detect the attitude information of the driver by measuring the motion of the pedal 2230 with respect to the shaft 2260.

In the above description, the first position sensor 2240 or the second position sensor can comprise, but is not limited to, a Hall sensor, an optical encoder, or a gyroscope, which can detect the rotation angle of the pedal relative 2230 with respect to the support frame 2220 or that of the support frame 2220 with respect to the ground.

In conclusion, the all-attitude human-machine interaction vehicle 2200 can detect the attitude information of a user standing on the pedal 2230 and drive the wheels 2280 to rotate based on the attitude information. More to the point, sitting or even standing on one foot, the user can still manipulate the all-attitude human-machine interaction vehicle 2200, which further adds to the fun in manipulation.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A human-machine interaction somatosensory vehicle, comprising:
   a vehicle body; and
   two wheels 130 mounted on the vehicle body, wherein the two wheels rotate around the vehicle body in a radial direction,
   wherein the vehicle body further includes:
      a support frame;
      two pedal devices mounted on the support frame;

a controller; and a driving device configured to drive the two wheels,
wherein a wheel shaft is mounted between each of the two wheels and the vehicle body; the wheel is rotatably connected to the vehicle body through the wheel shaft; and a center of gravity of the vehicle body is lower than a center of gravity of the wheel shaft;

the support frame is an integral structure rotatably connected to the two pedal devices;

the two pedal devices each includes a pedal foot board and a first position sensor, wherein the first position sensor is mounted between the pedal foot board and the support frame, and configured to detect stress information of the pedal device; and the controller is configured to control the driving device to drive the two wheels to move or turn based on the stress information of the pedal devices.

2. The human-machine interaction somatosensory vehicle of claim 1, wherein each of the first position sensors includes two sensing component regions located at two portions of the pedal foot board; and each of the first position sensors detects stress information of the two positions of the pedal foot board through the two sensing component regions to generate the stress information of the two pedal devices.

3. The human-machine interaction somatosensory vehicle of claim 2, wherein each of the two sensing component regions includes a first force receiving portion and a second force receiving portion, wherein the first force receiving portion of each of the sensing component regions abuts one of the support frame and the pedal foot board; and the second force receiving portion abuts the other one of the support frame and the pedal foot board.

4. The human-machine interaction somatosensory vehicle of claim 3, wherein the first position sensor includes a front end, a rear end, and a connect portion connecting the front end and the rear end; and each of the front end and the rear end includes the first force receiving portion, the second force receiving portion, and the sensing component region located between the first force receiving portion and the second force receiving portion.

5. The human-machine interaction somatosensory vehicle of claim 3, wherein a first gap is configured between the pedal foot board and the sensing component region.

6. The human-machine interaction somatosensory vehicle of claim 3, wherein a bottom surface of the one of the first force receiving portion or the second force receiving portion that abuts the pedal foot board is suspended.

7. The human-machine interaction somatosensory vehicle of claim 6, wherein each of the two pedal devices further includes a sensor holder mounted on the support frame; and the one of the first force receiving portion or the second force receiving portion that abuts the support frame abuts the support frame via the sensor holder.

8. The human-machine interaction somatosensory vehicle of claim 7, wherein the first force receiving portion abuts the pedal foot board;

the second force receiving portion abuts the sensor holder; and the bottom surface of the first force receiving portion is suspended.

9. The human-machine interaction somatosensory vehicle of claim 8, wherein a second gap is configured between the sensor holder and the sensing component region.

10. The human-machine interaction somatosensory vehicle of claim 1, wherein the bottom surface of each of the two pedal devices is recessed upward to accommodate a part of the support frame.

11. The human-machine interaction somatosensory vehicle of claim 1, wherein a guiding rail having a concave portion is mounted on the support frame; and one or more pedal device fixing brackets are inserted into the guiding rail to mount and hold the two pedal devices.

12. The human-machine interaction somatosensory vehicle of claim 11, wherein the guiding rail that the one or more pedal device fixing brackets inserted into includes either an integral guiding rail or two separate guiding rails on two sides of the vehicle respectively.

13. The human-machine interaction somatosensory vehicle of claim 11, wherein the pedal device fixing bracket includes:

an insertion part horizontally inserted into the guiding rail; and an installation part extending out of the guiding rail configured to mount and hold the two pedal devices.

14. The human-machine interaction somatosensory vehicle of claim 1, wherein one end of the wheel shaft is connected to the wheel and the other end of the wheel shaft is connected to a wheel shaft fixation board that is mounted on the vehicle body.

15. The human-machine interaction somatosensory vehicle of claim 14, wherein a motor holder matching with the wheel shaft fixation board is mounted on a side of the support frame; and a center of gravity of the motor holder is lower than the center of gravity of the wheel shaft.

16. The human-machine interaction somatosensory vehicle of claim 15, wherein a receiving chamber matching with the motor holder is mounted on the support frame; and the motor holder includes:

a plug end, configured to direct the motor holder to be plugged in the receiving chamber; and a cap portion connected to the plug end, configured to seal the receiving chamber.

17. The human-machine interaction somatosensory vehicle of claim 1, wherein a connection component is placed in the human-machine interaction somatosensory vehicle, the connection component including a power source connection component, a Hall connection component, and a temperature connection component configured to transmit temperature signals.

18. The human-machine interaction somatosensory vehicle of claim 17, wherein the power source is placed in the support frame, the power source including a temperature sensor configured to monitor an internal temperature of the power source; and the temperature connection component is connected to the temperature sensor.

19. The human-machine interaction somatosensory vehicle of claim 1, wherein a wheel cap is mounted on an outer side of each of the two wheels and anti-collision rubber is mounted on the wheel cap.

20. A human-machine interaction somatosensory vehicle, comprising:
  a vehicle body; and
  two wheels mounted on the vehicle body, wherein the two wheels rotate around the vehicle body in a radial direction,
  wherein the vehicle body further includes:
    a support frame;
    two pedal devices mounted on the support frame;
    a main control board positioned horizontally in the support frame; and
    a driving device configured to drive the two wheels,
      wherein a wheel shaft is mounted between each of the two wheels and the vehicle body; the wheel is rotatably connected to the vehicle body through the wheel shaft; and a center of gravity of the vehicle body is lower than a center of gravity of the wheel shaft;
      the support frame is an integral structure rotatably connected to the two pedal devices;
      the two pedal devices each includes a pedal foot board and a first position sensor, wherein the first position sensor is mounted between the pedal foot board and the support frame, and configured to detect stress information of the pedal device; and
      the main control board is configured to control the driving device to drive the two wheels to move or turn based on the stress information of the pedal devices.

21. The human-machine interaction somatosensory vehicle of claim 20, wherein a power source is placed in the support frame; and
  a battery docking interface is mounted on the main control board, wherein the battery docking interface is electrically connected to the power source.

22. The human-machine interaction somatosensory vehicle of claim 21, wherein supporting ribs configured to support the main control board are mounted on front and rear sides of the power source; and
  between the supporting ribs, a groove is formed between the main control board and the power source.

23. The human-machine interaction somatosensory vehicle of claim 20, wherein an external docking interface is mounted on left and right sides of the main control board, wherein the external docking interface is configured to electrically connect to at least one of the two driving devices on both sides in entirety or the first position sensor.

24. A human-machine interaction somatosensory vehicle, comprising:
  a vehicle body;
  two wheels mounted on the vehicle body, wherein the two wheels rotate around the vehicle body in a radial direction; and
  a connection component including a power source connection component, a Hall connection component, and a temperature connection component, configured to transmit a temperature signal;
  wherein the vehicle body further includes:
    a support frame;
    two pedal devices mounted on the support frame;
    a controller;
    a driving device configured to drive the two wheels; and
    a wheel shaft mounted between the two wheels and the vehicle body,
    wherein a wheel shaft is mounted between each of the two wheels and the vehicle body; the wheel is rotatably connected to the vehicle body through the wheel shaft; and a center of gravity of the vehicle body is lower than a center of gravity of the wheel shaft;
    the support frame is an integral structure rotatably connected to the two pedal devices;
    the two pedal devices each includes a pedal foot board and a first position sensor, wherein the first position sensor is mounted between the pedal foot board and the support frame, and configured to detect stress information of the pedal device;
    the controller is configured to control the driving device to drive the two wheels to move or turn based on the stress information of the pedal devices;
    the two wheels are rotatably connected to the vehicle body via the wheel shaft;
    the driving device is placed in the two wheels;
    a cable configured to connect the driving device is placed in the wheel shaft, the cable extending out of the wheel shaft to connect to a connector;
  a power source is placed in the support frame, the power source being connected to an external docking interface that is connected to the connector;
  a temperature sensor is mounted in the power source, the temperature sensor configured to monitor an internal temperature of the power source; and
  the temperature connection component is connected to the temperature sensor.

* * * * *